United States Patent
Yamaguchi

(10) Patent No.: US 11,856,407 B2
(45) Date of Patent: Dec. 26, 2023

(54) COMMUNICATION DEVICE, COMMUNICATION CONTROL METHOD, NON-TRANSITORY COMPUTER-READABLE MEDIUM, AND COMMUNICATION SYSTEM

(71) Applicant: NEC Platforms, Ltd., Kawasaki (JP)

(72) Inventor: Tomoki Yamaguchi, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 309 days.

(21) Appl. No.: 17/296,005

(22) PCT Filed: Oct. 17, 2019

(86) PCT No.: PCT/JP2019/040895
§ 371 (c)(1),
(2) Date: May 21, 2021

(87) PCT Pub. No.: WO2020/110499
PCT Pub. Date: Jun. 4, 2020

(65) Prior Publication Data
US 2022/0014928 A1    Jan. 13, 2022

(30) Foreign Application Priority Data
Nov. 29, 2018    (JP) .................................. 2018-223367

(51) Int. Cl.
*H04W 12/50*    (2021.01)
*H04W 12/088*    (2021.01)
(Continued)

(52) U.S. Cl.
CPC ........... *H04W 12/50* (2021.01); *H04W 12/06* (2013.01); *H04W 12/088* (2021.01);
(Continued)

(58) Field of Classification Search
CPC ... H04W 12/06; H04W 12/08; H04W 12/088; H04W 12/48; H04W 12/50; H04W 12/63;
(Continued)

(56) References Cited

U.S. PATENT DOCUMENTS

2005/0132193 A1* 6/2005 Ishidoshiro ........... H04W 12/04
713/171
2015/0208364 A1* 7/2015 Fukuhara ................ H04W 4/48
455/522
(Continued)

FOREIGN PATENT DOCUMENTS

| CN | 104346111 A | 2/2015 |
| CN | 105850158 A | 8/2016 |

(Continued)

OTHER PUBLICATIONS

International Search Report for PCT Application No. PCT/JP2019/040895, dated Dec. 10, 2019.
(Continued)

*Primary Examiner* — Nguyen T Vo
(74) *Attorney, Agent, or Firm* — Sughrue Mion, PLLC

(57) ABSTRACT

A communication device includes a first communication unit configured to start in a state where all communication terminals in a first communication area are connectable and acquire first identification information of a connected communication terminal, and a control unit configured to acquire, from among pieces of the acquired first identification information, third identification information being associated with second identification information of a communication terminal permitted to connect to a second communication unit forming a second communication area. The first communication unit shifts into a state where only a communication terminal having the third identification information is connectable. The control unit receives, from a communication device, information about whether a com-
(Continued)

munication terminal having the second identification information is connected to the second communication unit, and controls, based on the received information, whether to cause a communication terminal having the third identification information to communicate with the first communication unit.

19 Claims, 12 Drawing Sheets

(51) Int. Cl.
  *H04W 12/71* (2021.01)
  *H04W 12/48* (2021.01)
  *H04W 12/06* (2021.01)
  *H04W 48/04* (2009.01)
  *H04W 4/48* (2018.01)

(52) U.S. Cl.
  CPC ........... *H04W 12/48* (2021.01); *H04W 12/71* (2021.01); *H04W 48/04* (2013.01); *H04W 4/48* (2018.02)

(58) Field of Classification Search
  CPC ....... H04W 12/71; H04W 16/32; H04W 4/33; H04W 4/42; H04W 4/48; H04W 4/80; H04W 48/04; H04W 84/12; H04W 88/10; Y02D 30/70
  See application file for complete search history.

(56) References Cited

U.S. PATENT DOCUMENTS

| | | | |
|---|---|---|---|
| 2017/0201927 A1* | 7/2017 | Kobayashi | H04W 40/22 |
| 2018/0014188 A1* | 1/2018 | Liu | H04W 12/08 |
| 2018/0302789 A1 | 10/2018 | Fukasawa | |
| 2018/0310355 A1* | 10/2018 | Sato | H04L 69/18 |
| 2019/0273817 A1 | 9/2019 | Ueno et al. | |
| 2020/0413242 A1* | 12/2020 | Yokoyama | B60R 25/24 |

FOREIGN PATENT DOCUMENTS

| | | |
|---|---|---|
| CN | 107203347 A | 9/2017 |
| JP | 2010-118861 A | 5/2010 |
| JP | 2013-198130 A | 9/2013 |
| JP | 2016-072671 A | 5/2016 |
| JP | 2017-208666 A | 11/2017 |
| JP | 2018-085594 A | 5/2018 |

OTHER PUBLICATIONS

Japanese Office Action for JP Application No. 2020-558165 dated Jun. 21, 2022 with English Translation.
Chinese Office Action for CN Application No. 201980078959.8, dated Sep. 9, 2023 with English Translation.

* cited by examiner

COMMUNICATION DEVICE, COMMUNICATION CONTROL METHOD, NON-TRANSITORY COMPUTER-READABLE MEDIUM, AND COMMUNICATION SYSTEM

This application is a National Stage Entry of PCT/JP2019/040895 filed on Oct. 17, 2019, which claims priority from Japanese Patent Application 2018-223367 filed on Nov. 29, 2018, the contents of all of which are incorporated herein by reference, in their entirety.

TECHNICAL FIELD

The present disclosure relates to a communication device, a communication control method, a communication control program, and a communication system.

BACKGROUND ART

A current communication terminal such as a smartphone, a tablet-type terminal, or a personal computer is mounted with a wireless local area network (LAN) communication function. Further, in a store or the like, a communication device such as a wireless local area network (LAN) access point (wireless LAN router) is placed, and enables wireless LAN communication.

A communication device placed in a store or the like is mainly placed as a part of service for a customer of the store or the like, and, therefore, a manager of the communication device may desire to provide wireless LAN communication to only a communication terminal of a customer present in the store or the like. In connection with this, a technique of determining whether a communication terminal is present in a predetermined region is also studied (e.g., Patent Literature 1).

CITATION LIST

Patent Literature

[Patent Literature 1] Japanese Unexamined Patent Application Publication No. 2018-085594

SUMMARY OF INVENTION

Technical Problem

In order to satisfy the desire described above, it is conceived to limit a range (communicable range) of providing wireless LAN communication, for example, by limiting transmission output of a communication device. However, when such a method is used, communication quality in a communication terminal that performs communication with the communication device described above deteriorates and a communication speed also deteriorates accordingly, as the communication terminal becomes closer to a boundary of the communicable range.

Herein, the technique disclosed in Patent Literature 1 is a technique of determining whether a communication terminal is present in a predetermined region. It is conceived to achieve the desire described above by use of the technique disclosed in Patent Literature 1. However, Patent Literature 1 does not disclose a specific configuration for achieving the desire described above.

An object of the present disclosure has been made in order to solve the problem described above, and is to provide a communication device, a communication control method, a communication control program, and a communication system that are capable of limiting a communicable range without deteriorating a communication speed of a communication terminal.

Solution to Problem

A communication device according to the present disclosure includes:
a first communication unit configured to form a first communication area, and acquire first identification information of a communication terminal connected in a state where all communication terminals in the first communication area are connectable; and
a control unit configured to acquire, from among pieces of the acquired first identification information, third identification information that another communication device has and that is associated with second identification information of a communication terminal permitted to connect to a second communication unit forming a second communication area included in the first communication area, wherein
when the third identification information is acquired, the first communication unit shifts into a state where only a communication terminal having the third identification information is connectable, and
the control unit receives, from the another communication device, information about whether a communication terminal having the second identification information is connected to the second communication unit, and controls, based on the received information, whether to cause a communication terminal having the third identification information to communicate with the first communication unit.

A communication device according to the present disclosure includes:
a first communication unit configured to form a first communication area, and acquire first identification information of a communication terminal connected in a state where all communication terminals in the first communication area are connectable;
a second communication unit configured to form a second communication area included in the first communication area, and acquire second identification information of a communication terminal permitted to connect; and
a control unit configured to register any of pieces of the acquired first identification information and the second identification information in association with each other, wherein
the first communication unit shifts into a state where only a communication terminal having third identification information indicating identification information registered in association with the second identification information is connectable, and
the control unit controls, based on whether a communication terminal having the second identification information is connected to the second communication unit, whether to cause a communication terminal having the third identification information to communicate with the first communication unit.

A communication control method according to the present disclosure includes:
acquiring first identification information of a communication terminal connected to a first communication unit configured to form a first communication area and operate in a state where all communication terminals in the first communication area are connectable;

acquiring, from among pieces of the acquired first identification information, third identification information that another communication device has and that is associated with second identification information of a communication terminal permitted to connect to a second communication unit forming a second communication area included in the first communication area;

shifting the first communication unit into a state where only a communication terminal having the third identification information is connectable, when the third identification information is acquired; and receiving, from the another communication device, information about whether a communication terminal having the second identification information is connected to the second communication unit, and controlling, based on the received information, whether to cause a communication terminal having the third identification information to communicate with the first communication unit.

A communication control program according to the present disclosure causes a computer to execute:

acquiring first identification information of a communication terminal connected to a first communication unit configured to form a first communication area and operate in a state where all communication terminals in the first communication area are connectable;

acquiring, from among pieces of the acquired first identification information, third identification information that another communication device has and that is associated with second identification information of a communication terminal permitted to connect to a second communication unit forming a second communication area included in the first communication area;

shifting the first communication unit into a state where only a communication terminal having the third identification information is connectable, when the third identification information is acquired; and receiving, from the another communication device, information about whether a communication terminal having the second identification information is connected to the second communication unit, and controlling, based on the received information, whether to cause a communication terminal having the third identification information to communicate with the first communication unit.

Advantageous Effects of Invention

The present disclosure can provide a wireless communication device, a communication control method, a communication control program, and a communication system that are capable of limiting a communicable range without deteriorating a communication speed of a communication terminal.

DESCRIPTION OF EMBODIMENTS

Hereinafter, example embodiments of the present disclosure will be described with reference to the drawings. Note that, in the following description and drawings, omission and simplification are suitably made for clarification of description. Further, in each of the following drawings, the same reference sign is given to the same element, and repeated description is omitted as required.

First Example Embodiment

Figure 1:
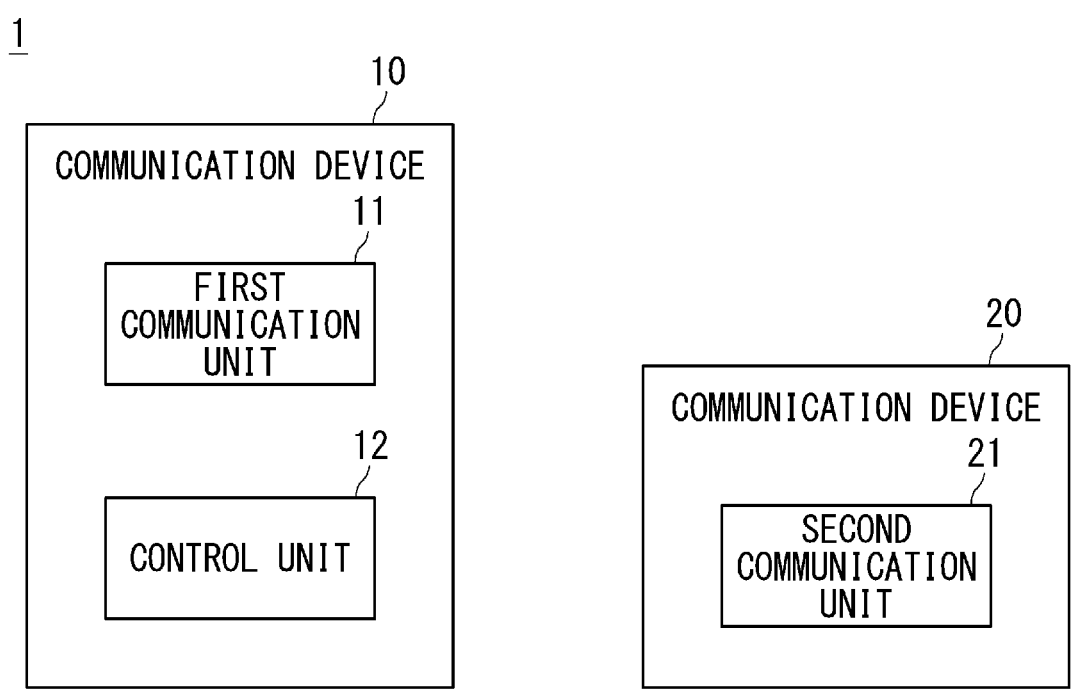
FIG. 1 is a diagram illustrating a configuration example of a communication system according to a first example embodiment.

A first example embodiment is described by use of FIG. 1. FIG. 1 is a diagram illustrating a configuration example of a communication system according to the first example embodiment. A communication system 1 includes a communication device 10 and a communication device 20. Each of the communication devices 10 and 20 may be a communication device such as a router, a mobile router, a display system, or an in-vehicle device.

The communication device 10 is connected to the communication device 20, and performs communication with the communication device 20. The communication device 10 may perform connection to and communication with the communication device 20 in a wired manner, or may perform connection to and communication with the communication device 20 in a wireless manner. The communication device 10 includes a first communication unit 11, and is capable of performing connection to and communication with a non-illustrated communication terminal via the first communication unit 11.

The first communication unit 11 may be a communication unit being compatible with wireless LAN communication such as Wi-Fi, or may be a communication unit being compatible with Bluetooth (registered trademark) or Bluetooth low energy (BLE) communication. A communication terminal is compatible with at least two communication schemes (communication methods), for example, a wireless LAN and Bluetooth.

The communication device 20 is a communication device including a second communication unit 21 whose transmission output is previously adjusted and which covers a predetermined region as a communicable range. The communication device 20 is capable of performing connection to and communication with a communication terminal via the second communication unit 21.

The second communication unit 21 may be a communication unit being compatible with wireless LAN such as Wi-Fi. The communication unit 21 may be a communication unit being compatible with Bluetooth or BLE. Note that, a communication scheme with which the second communication unit 21 is compatible may be different from a communication scheme with which the first communication unit 11 is compatible.

The communication device 10 includes the first communication unit 11 and a control unit 12.

The first communication unit 11 forms a first communication area, and acquires first identification information of a communication terminal connected in a state where all communication terminals in the first communication area are connectable. The first communication area is a communication area including a predetermined region. The predetermined region may be a previously determined region inside a building. The predetermined region may be a previously determined region inside a moving body. The moving body may be a vehicle including one of an automobile and a train.

For example, when the first communication unit 11 is a communication unit being compatible with Wi-Fi, the first communication unit 11 operates in a state of so-called free Wi-Fi being a state where authentication information such as a password is not set and being a state where all communication terminals in the first communication area are connectable. Then, the first communication unit 11 acquires first identification information of a connected communication terminal. Since identification information of a communication terminal can be acquired for the first time when the communication terminal is connected, the first communication unit 11 operates in a state where all communication terminals in the first communication area are connectable as described above.

The first identification information is identification information of a communication unit that is included in a communication terminal, and that performs communication by a communication scheme with which the first communication unit 11 is compatible. The first identification information may be, for example, a media access control (MAC) address, or may be an equipment name, an identifier (ID), or an identification code with which the communication unit is identified.

The control unit 12 acquires, from among pieces of the acquired first identification information, third identification information that the communication device 20 has and that is associated with second identification information of a communication terminal permitted to connect to the second communication unit 21 forming a second communication area included in the first communication area.

The second identification information is identification information of a communication unit that is included in a communication terminal, and that performs communication by a communication scheme with which the second communication unit 21 is compatible. For example, the second identification information may be a MAC address, or may be an equipment name, an ID, or an identification code with which the communication unit is identified.

When the communication device 20 has a function of registration associating any of pieces of the acquired first identification information with the second identification information of a communication terminal permitted to connect to the second communication unit 21, the control unit 12 transmits the acquired first identification information to the communication device 20. Then, the communication device 20 may receive third identification information indicating identification information registered in association with the second identification information, and acquire the third identification information being associated with the second identification information of a communication terminal permitted to connect to the second communication unit 21.

Alternatively, when the communication device 10 has a function of registration associating any of pieces of the first identification information acquired in the first communication unit 11 with the second identification information of a communication terminal permitted to connect to the second communication unit 21, the communication device 10 acquires second identification information from the communication device 20. Then, the communication device 10 may register any of pieces of the acquired first identification information and the second identification information in association with each other, and acquire, as the third identification information, identification information registered in association with the second identification information.

When the third identification information is acquired, the first communication unit 11 shifts into a state where only a communication terminal having the third identification information is connectable. In order to acquire a candidate of identification information being associated with the second identification information, the first communication unit 11 starts in a state where all communication terminals in the first communication area are connectable. When the third identification information is acquired, the first communication unit 11 cuts off connection and shifts into a state where subsequent connection is rejected, in such a way that a communication terminal other than the communication terminal having the third identification information is not connected.

The control unit 12 receives, from the communication device 20, information about whether a communication terminal having the second identification information is connected to the second communication unit 21. The control unit 12 controls, based on the received information, whether to cause the communication terminal having the third identification information to communicate with the first communication unit 11.

As described above, the first communication unit 11 operates in a state where all communication terminals in the first communication area are connectable, and acquires a candidate of first identification information being associated with second identification information. The control unit 12 acquires, from among pieces of the acquired first identification information, third identification information being associated with second identification information of a communication terminal permitted to connect to the second communication unit 21. Thus, a communication terminal targeted for controlling communication is specified.

The control unit 12 controls, based on whether the communication terminal targeted for controlling communication is connected to the second communication unit 21, whether to cause the communication terminal to communicate with the first communication unit 11. In other words, the control unit 12 controls, based on whether a communication terminal is present in the second communication area, whether to cause the communication terminal to communicate with the first communication unit 11. Specifically, the control unit 12 limits, to the second communication area, a range where a communication terminal is communicable with the first communication unit 11. Further, since transmission output of the first communication unit 11 is not limited, the communication device 10 does not deteriorate a communication speed of a communication terminal. Therefore, the communication device 10 according to the first example embodiment enables limiting a communicable range without deteriorating a communication speed of a communication terminal.

Second Example Embodiment

Figure 2:
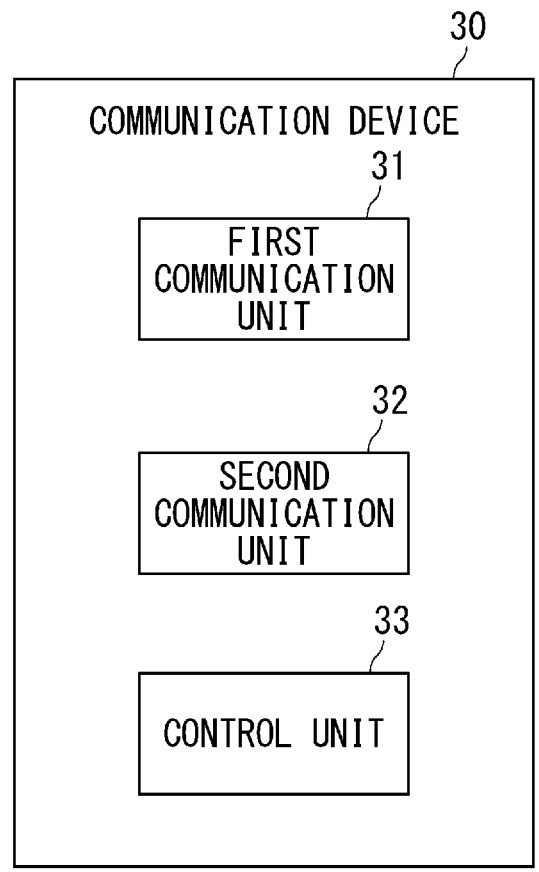
FIG. 2 is a diagram illustrating a configuration example of a communication device according to a second example embodiment.

Now, a second example embodiment is described. A communication device 30 according to the second example embodiment is described by use of FIG. 2. FIG. 2 is a diagram illustrating a configuration example of a communication device according to the second example embodiment. The communication device 30 according to the present example embodiment has a configuration in which the communication device 10 according to the first example embodiment includes the second communication unit 21 that the communication device 20 includes.

The communication device 30 includes a first communication unit 31, a second communication unit 32, and a control unit 33. Since configurations of the first communication unit 31 and the second communication unit 32 are basically similar to those according to the first example embodiment, description thereof is omitted accordingly.

Since the first communication unit 31 has a configuration similar to the first communication unit 11 according to the first example embodiment, description thereof is omitted.

The second communication unit 32 corresponds to the second communication unit 21 according to the first example embodiment. The second communication unit 32 forms a second communication area included in a first communication area formed by the first communication unit 31. The second communication unit 32 has transmission output previously adjusted, and forms the second communication area in a predetermined region.

The second communication unit 32 may be a communication unit being compatible with wireless LAN such as Wi-Fi, or may be a communication unit being compatible with Bluetooth or BLE. Note that, a communication scheme with which the second communication unit 32 is compatible may be different from a communication scheme with which the first communication unit 31 is compatible.

The second communication unit 32 acquires second identification information of a communication terminal permitted to connect to the second communication unit 32.

The control unit 33 registers any of pieces of first identification information acquired in the first communication unit 31 and the second identification information acquired in the second communication unit 32, in association with each other. Further, the control unit 33 controls, based on whether a communication terminal having second identification information is connected to the second communication unit 32, whether to cause a communication terminal having third identification information being identification information registered in association with the second identification information to communicate with the first communication unit 31.

As described above, the control unit 33 registers any of pieces of the first identification information acquired in the first communication unit 31 and the second identification information acquired in the second communication unit 32, in association with each other, and specifies a communication terminal targeted for controlling communication. The control unit 33 controls, based on whether a communication terminal targeted for controlling communication is connected to the second communication unit 32, whether to cause the communication terminal to communicate with the first communication unit 31. In other words, the control unit 33 controls, based on whether a communication terminal is present in the second communication area, whether to cause the communication terminal to communicate with the first communication unit 31. Specifically, the control unit 33 limits, to the second communication area, a range where a communication terminal is communicable with the first communication unit 31. Further, since the communication device 30 does not limit transmission output of the first communication unit 31, the communication device 30 does not deteriorate a communication speed of a communication terminal. Therefore, the communication device 30 according to the second example embodiment enables limiting a communicable range without deteriorating a communication speed of a communication terminal.

Third Example Embodiment

Now, a third example embodiment is described. The third example embodiment is an example embodiment in which the first example embodiment is described in detail.

Configuration Example of Communication System

Figure 3:
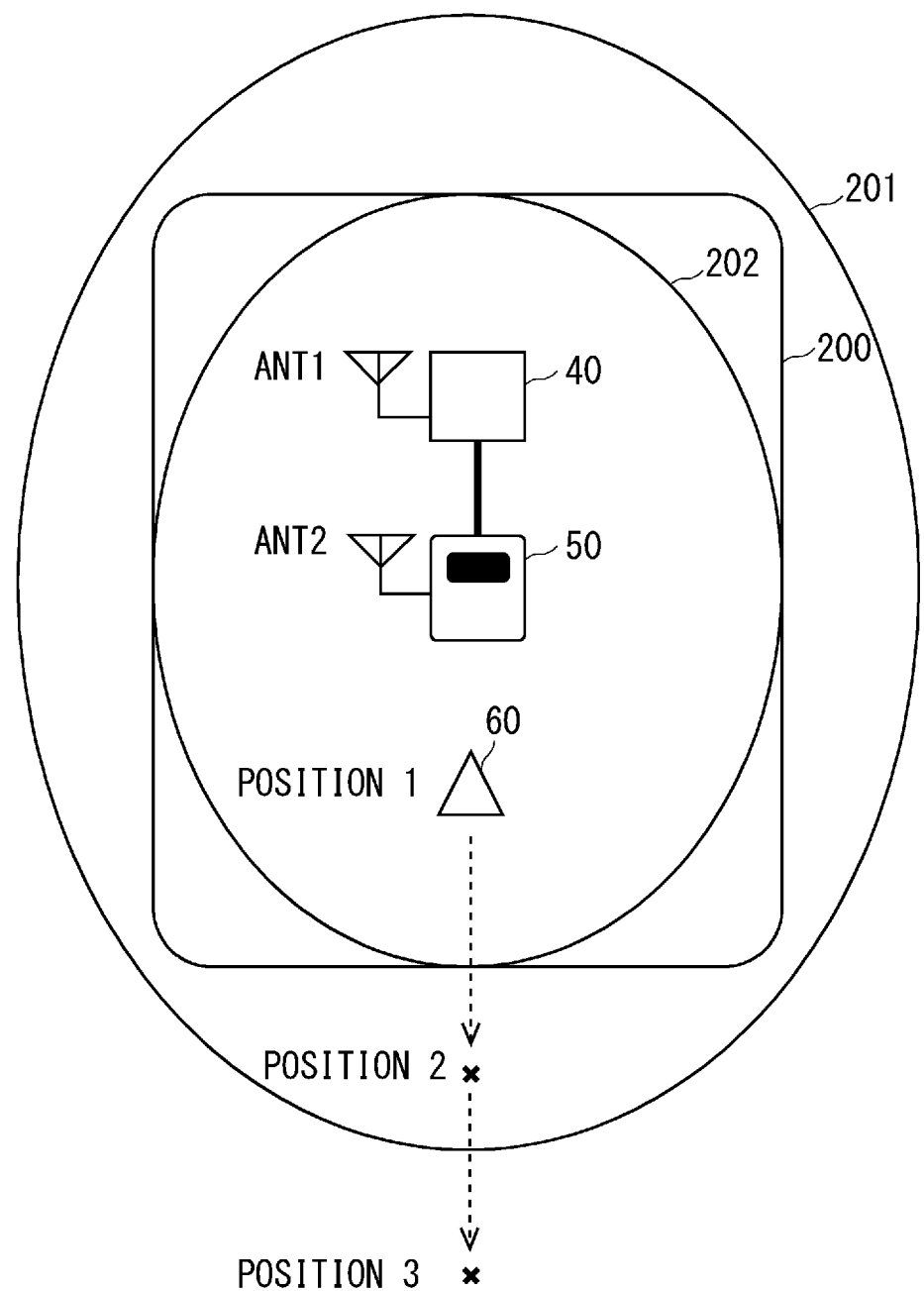
FIG. 3 is a diagram illustrating a configuration example of a communication system according to a third example embodiment.

A communication system 100 according to the third example embodiment is described by use of FIG. 3. FIG. 3 is a diagram illustrating a configuration example of a communication system according to the third example embodiment. FIG. 3 is also a diagram illustrating a position relation of a communication device in the communication system 100.

The communication system 100 is a communication system used in a predetermined region. The predetermined region may be a previously determined region inside a building or inside a moving body. The moving body may be an automobile or a train. The following description is given assuming that the predetermined region is a region inside an automobile. Note that, the present example embodiment is naturally not restricted to this.

The communication system 100 includes a router 40, an in-vehicle device 50, and a communication terminal 60.

In FIG. 3, a full line 200 is a line indicating a contour (boundary) of an automobile, inside of the full line 200 is a region inside the automobile, and outside of the full line 200 is a region outside the automobile. The router 40 and the in-vehicle device 50 are arranged in the automobile.

The router 40 corresponds to the communication device 10 according to the first example embodiment. The router 40 is connected to the in-vehicle device 50 via universal serial bus (USB) connection, and performs communication with the in-vehicle device 50 via the USB connection.

The router 40 is a communication device being capable of wide area network (WAN) wireless communication and wireless LAN communication. The router 40 includes a wireless LAN communication unit that performs wireless LAN communication, and is configured to be connectable to and communicable with the communication terminal 60 via an antenna (ANT) 1.

A full line 201 indicates a boundary of a communication area relating to wireless LAN communication of the router 40. A communication area of the router 40 is determined by transmission output of the router 40, but, in the present example embodiment, it is assumed that transmission output of the router 40 is not adjusted, and a communication area of the router 40 is a range being larger than an area surrounded by the full line 200. Specifically, it is assumed that a communication area of the router 40 is a range being wider than a region inside an automobile.

Generally, in wireless LAN communication having one router 40 and one communication terminal 60, a distance up to the communication terminal 60 in which communication can be established by a modulation scheme at a maximum link rate is determined due to performance of the router 40. For example, it is assumed that the communication terminal 60 being present at a position 1 in a vehicle connects (belongs) to the router 40 and performs date communication. When it is assumed that the communication terminal 60 moves to a position 2 from this state and further moves to a position 3, a signal noise ratio (SNR) decreases (deteriorates) as the communication terminal 60 becomes distant from the router 40. When the communication terminal 60 moves to a position 3, the communication terminal 60 is out of the communication area (full line 201) of the router 40, so that a modulation rate becomes low, and a communication speed starts to deteriorate.

Note that, when the communication terminal 60 moves away from the router 40 further than the position 3, an SNR that is a ratio between transmission output (a reception level) of the router 40 being a communication partner reaching a local device and a noise floor generally becomes low in the communication terminal 60 receiving a signal. Then, when the SNR becomes less than or equal to a given value, the signal cannot be read, communication cannot be performed, and, therefore, connection between the communication terminal 60 and the router 40 is cut off (disconnected).

Figure 4:
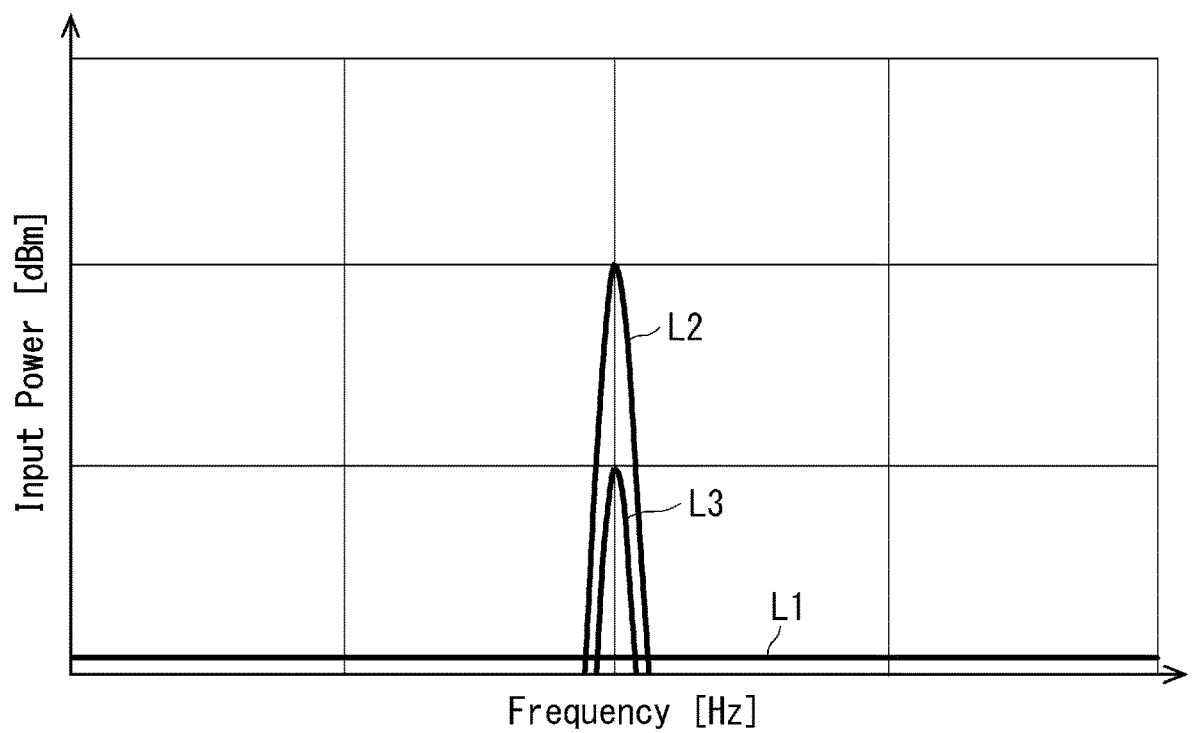
FIG. 4 is a conceptual diagram describing an SNR.

Herein, the above-described content is described by use of a conceptual diagram of an SNR. FIG. 4 is a conceptual diagram describing an SNR. A horizontal axis indicates frequency [Hz] at which communication is performed, and a vertical axis indicates power levels [dBm] of an input signal and a noise floor.

In FIG. 4, a full line L1 indicates a noise floor, and is constant regardless of transmission output of the router 40 at which a signal is transmitted. It is assumed that a full line L2 is, for example, a reception level in the communication terminal 60 at which a transmission signal of the router 40 is received when the communication terminal 60 is present at the position 1. It is assumed that a full line L3 is, for example, a reception level in the communication terminal 60 at which a transmission signal of the router 40 is received when the communication terminal 60 moves from the position 1 to the position 2 or 3.

Thus, a reception level deteriorates as the communication terminal 60 gradually moves away from the router 40. As described above, the noise floor (full line L1) is constant, an SNR is a ratio between the reception level and the noise floor, and, therefore, an SNR in the communication terminal 60 decreases together with a distance from the router 40. Then, when an SNR is less than a predetermined threshold value in the communication terminal 60, it is determined that communication with the router 40 cannot be performed, and a communication between the router 40 and the communication terminal 60 is cut off.

Returning to FIG. 3, the in-vehicle device 50 is described. The in-vehicle device 50 corresponds to the communication device 20 according to the first example embodiment. The in-vehicle device 50 is a communication device mounted on an automobile. In other words, the in-vehicle device 50 is a communication device arranged inside the automobile.

The in-vehicle device 50 may be, for example, a display system, a car navigation system, a router, a mobile router, a personal computer device, a smartphone terminal, or a tablet terminal.

The in-vehicle device 50 includes a Bluetooth communication unit being capable of BLE communication, and is configured to be connectable to and communicable with the communication terminal 60 via an antenna (ANT) 2. The Bluetooth communication unit of the in-vehicle device 50 has transmission output previously adjusted, and a boundary of a communication area is adjusted to a full line 202. Specifically, a communication area of the in-vehicle device 50 is included in the communication area of the router 40, and formed inside an automobile.

Figure 5:
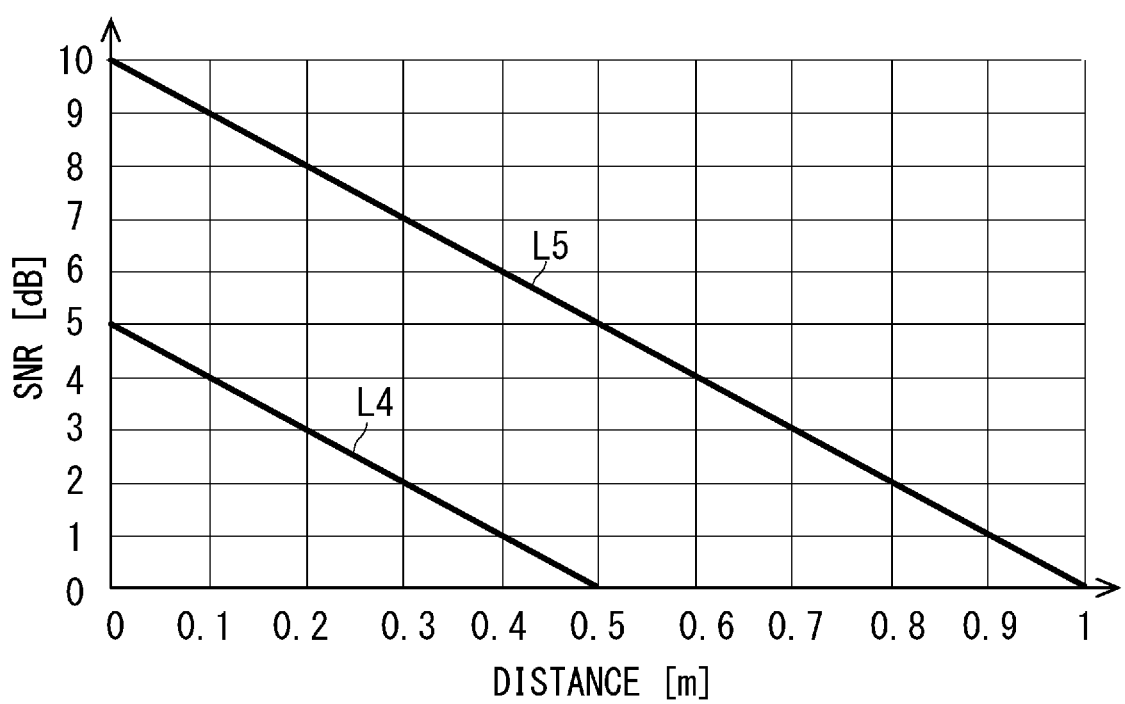
FIG. 5 is a conceptual diagram describing an adjustment method of a communication area in an in-vehicle device.

Next, a method of adjusting transmission output of the in-vehicle device 50 is described by use of FIG. 5. FIG. 5 is a conceptual diagram describing an adjustment method of a communication area in an in-vehicle device. Note that, a concept of an SNR described in FIG. 4 is similar in the in-vehicle device 50 as well, and, therefore, this is assumed to be a premise.

In FIG. 5, a horizontal axis indicates a distance [m] between the in-vehicle device 50 and the communication terminal 60, and a vertical axis indicates an SNR [dB] in the communication terminal 60. For example, it is assumed that a characteristic of an SNR when transmission output of the in-vehicle device 50 is set to a certain value is a full line L4. Regarding the full line L4, when a distance between the in-vehicle device 50 and the communication terminal 60 is 0 [m], an SNR is 5 [dB]. When it is assumed that a space loss in communication frequency is constant at 10 [dB/m] at a distance of 0 to 1 [m], an SNR becomes 0 [dB/m] at a distance of 0.5 [m]. When it is assumed that a condition necessary for communication establishment is SNR>0 [dB], the communication terminal 60 is cut off from communication at a distance of 0.5 [m] or more from the in-vehicle device 50.

When transmission output of the in-vehicle device 50 is set to be 5 [dB] more than the characteristic of the full line L4, a characteristic of an SNR becomes as indicated by a full line L5. In this case, when a distance between the communication terminal 60 and the in-vehicle device 50 is equal to or more than 1 [m], an SNR becomes 0 [dB], and, therefore, communication is cut off. Adjusting transmission output of the in-vehicle device 50 in this way enables restricting, to inside a vehicle, a distance (communication area) of being communicable with the communication terminal 60. Note that, since transmission output of the in-vehicle device 50 needs to be suitably set according to a size of an automobile, the in-vehicle device 50 stores transmission output adjusted in advance. Further, a communication area of the in-vehicle device 50 is preferably about the same as a region inside an automobile.

Returning to FIG. 3, the communication terminal 60 is described. The communication terminal 60 may be, for example, a smartphone terminal, a tablet terminal, or a personal computer device. The communication terminal 60 is a communication terminal being compatible with wireless LAN communication and Bluetooth communication. Note that, the communication terminal 60 may be compatible with WAN communication, such as long term evolution (LTE), provided by a telecommunications carrier. The communication terminal 60 performs connection to and communication with the router 40 by wireless LAN communication. Further, the communication terminal 60 performs connection to and communication with the in-vehicle device 50 by Bluetooth communication.

Configuration Example of Router

Figure 6:
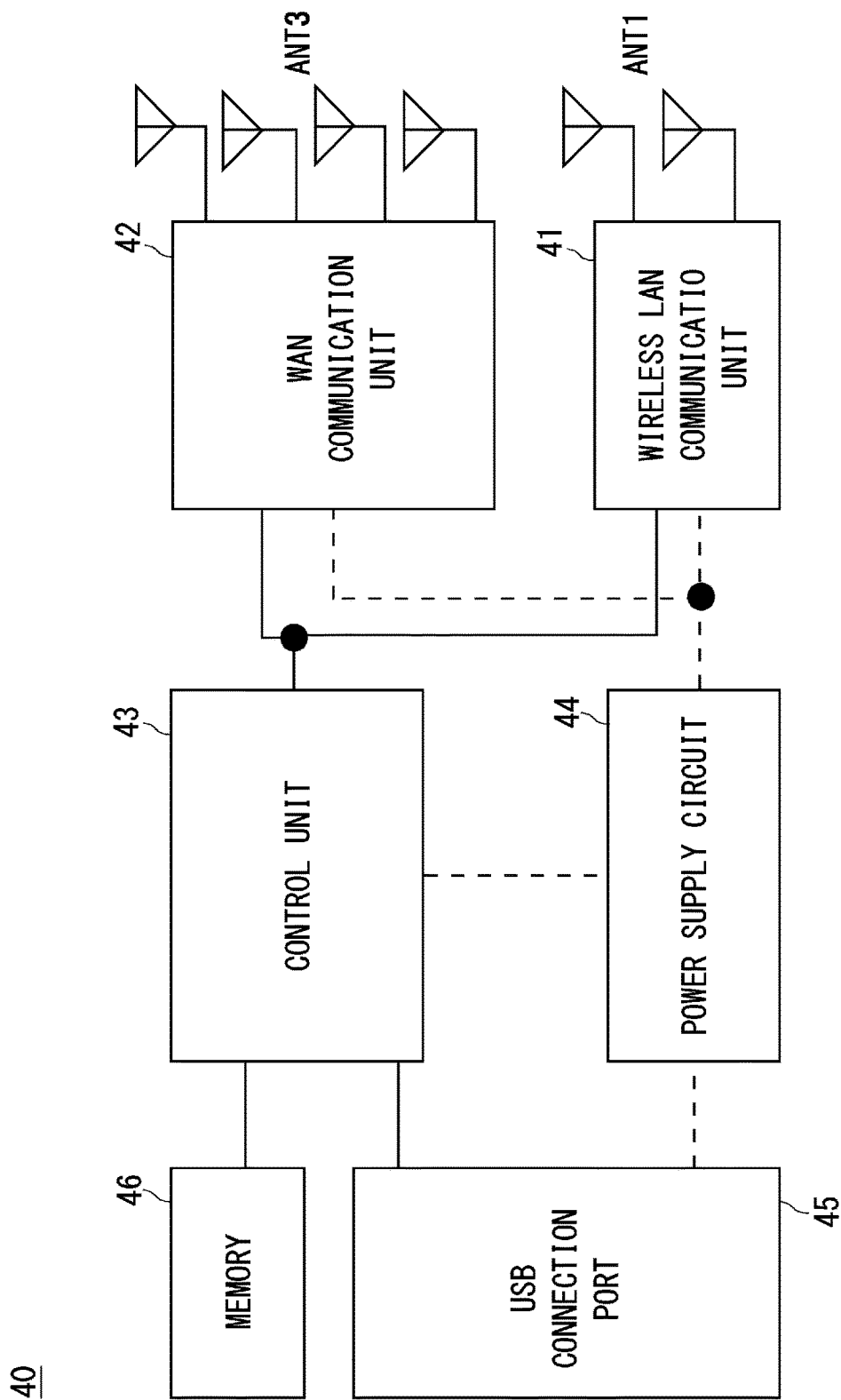
FIG. 6 is a diagram illustrating a configuration example of a router according to the third example embodiment.

Next, a configuration example of the router 40 is described by use of FIG. 6. FIG. 6 is a diagram illustrating a configuration example of a router according to the third example embodiment. The router 40 includes a wireless LAN communication unit 41, a WAN communication unit 42, a control unit 43, a power supply circuit 44, a USB connection port 45, and a memory 46. In FIG. 6, a full line connecting functional units indicates a connection line between functional units performing transmission, reception, and the like of data and the like, and a dotted line connecting functional units indicates a connection line between functional units indicating supply of power.

The wireless LAN communication unit 41 corresponds to the first communication unit 11 according to the first example embodiment. The wireless LAN communication unit 41 performs wireless LAN communication with the communication terminal 60 via the ANT 1. The wireless LAN communication unit 41 is connected to the WAN communication unit 42, and, when communication with the communication terminal 60 is performed, the communication terminal 60 connects to a WAN line via the WAN communication unit 42, and enables Internet connection.

The wireless LAN communication unit 41 forms a communication area indicated by the full line 201 in FIG. 3. The wireless LAN communication unit 41 normally operates in a state where only an authenticated communication terminal is connectable and communicable by use of authentication information such as a password. When receiving a request for restart from the control unit 43 described later, the wireless LAN communication unit 41 does not perform authentication using authentication information such as a password, starts in a state where all communication terminals in a communication area are connectable, and operates in this state. In other words, when the wireless LAN communication unit 41 is a communication unit being compatible with Wi-Fi, the wireless LAN communication unit 41 starts in a state of so-called free Wi-Fi, and operates in this state.

The wireless LAN communication unit 41 acquires identification information of a communication unit that performs wireless LAN communication of a connected communication terminal. When the communication terminal 60 is connected, the wireless LAN communication unit 41 acquires identification information of a communication unit that performs wireless LAN communication of the communication terminal 60. The wireless LAN communication unit 41 transmits the acquired identification information to the control unit 43.

For example, the identification information may be a MAC address, or may be an equipment name, an ID, or an identification code with which the communication unit is identified. In the following description, description is given assuming that the identification information is a MAC address and an equipment name. Note that, the equipment name may be a name uniquely set for the communication terminal 60.

The MAC address and the equipment name of the communication terminal cannot be acquired unless the communication terminal is in a state where the communication terminal belongs to the router 40 and data communication can be performed. Thus, the wireless LAN communication unit 41 starts in a free state being a state where authentication by authentication information such as a password is not performed in such a way that a communication terminal in a communication area is capable of connecting (belonging) to the wireless LAN communication unit 41 for a given time. The wireless LAN communication unit 41 is then brought into a state where a MAC address of a communication unit that performs wireless LAN communication of the communication terminal connecting (belonging) to the wireless LAN communication unit 41 is acquirable. In other words, the wireless LAN communication unit 41 has a function of operating in a free state, causing a connectable communication terminal being in a communication area to connect, and collecting a MAC address of a communication unit that performs wireless LAN communication of the communication terminal.

When any of the acquired MAC addresses is registered in association with a MAC address acquired by the in-vehicle device 50, the control unit 43 described later receives the registered MAC address from the in-vehicle device 50. When the control unit 43 receives the MAC address, the wireless LAN communication unit 41 transmits, for example, authentication information such as a password to the communication terminal of the MAC address.

When the MAC address of the communication terminal 60 is registered in the in-vehicle device 50, the wireless LAN communication unit 41 transmits authentication information such as a password to the communication terminal 60. In the following description, description is given assuming that the MAC address of the communication terminal 60 is registered in association with a MAC address acquired in the in-vehicle device 50.

Note that, the in-vehicle device 50 may register the equipment name acquired in the wireless LAN communication unit 41 and the equipment name acquired in the in-vehicle device 50, in association with each other. In this case, the control unit 43 receives the registered equipment name from the in-vehicle device 50. The wireless LAN communication unit 41 transmits authentication information such as a password to the communication terminal 60 for which the registered equipment name is set.

After transmitting authentication information such as a password to the communication terminal 60, the wireless LAN communication unit 41 cancels (releases) connection of a communication terminal other than the communication terminal 60, and shifts into a state where only the communication terminal 60 having the authentication information is connectable. In other words, the wireless LAN communication unit 41 shifts into a normal state, and rejects connection of a communication terminal other than the communication terminal 60 having the authentication information.

Further, the wireless LAN communication unit 41 performs establishment or cut-off of communication with the communication terminal 60, based on a request from the control unit 43. When requested from the control unit 43 to establish communication with the communication terminal 60 after cutting off communication with the communication terminal 60, the wireless LAN communication unit 41 automatically connects to the communication terminal 60 by use of the authentication information.

The WAN communication unit 42 is a wireless communication unit that can connect to a WAN line via an ANT 3 and a base station. The WAN communication unit 42 controls the number of antennas used for transmission and reception during communication. In the WAN communication unit 42, when the wireless LAN communication unit 41 performs communication with the communication terminal 60, and, for example, when the communication terminal 60 connects to the Internet, the communication terminal 60 connects to a WAN line via the ANT 3 and a base station, and performs Internet connection.

The control unit 43 corresponds to the control unit 12 according to the first example embodiment. The control unit 43 is a control unit that controls the router 40, performs control of the wireless LAN communication unit 41 and the WAN communication unit 42, and performs a routing operation necessary for Internet line connection.

When receiving an instruction from the in-vehicle device 50 to restart the wireless LAN communication unit 41, the control unit 43 causes the wireless LAN communication unit 41 to restart.

Further, the control unit 43 acquires a MAC address being associated with the MAC address acquired in the in-vehicle device 50 from among MAC addresses acquired in the wireless LAN communication unit 41.

Specifically, the control unit 43 transmits the MAC address and the equipment name acquired by the wireless LAN communication unit 41 to the in-vehicle device 50 via a USB cable connected to a USB port 45 described later. When any of the transmitted MAC addresses is registered in association with the MAC address acquired in the in-vehicle device 50, the control unit 43 receives the registered MAC address from among the MAC addresses transmitted from the in-vehicle device 50. The control unit 43 acquires the received MAC address as a MAC address registered in association with the MAC address acquired in the in-vehicle device 50. In other words, the control unit 43 acquires a MAC address of a communication unit that performs wireless LAN communication of a communication terminal being a communication control target. In the following description, description is given assuming that the MAC address of a communication unit that performs wireless LAN communication of the communication terminal 60, and the MAC address of a communication unit that performs Bluetooth communication of the communication terminal 60 are registered in the in-vehicle device 50 in association with each other. In this case, the control unit 43 receives, from the in-vehicle device 50, the MAC address of the communication unit that performs wireless LAN communication of the communication terminal 60.

Note that, in the present example embodiment, it is assumed that a MAC address is used as described above, but an equipment name may be used instead of a MAC address. In other words, the in-vehicle device 50 may register an equipment name acquired in the wireless LAN communication unit 41 and an equipment name acquired in the in-vehicle device 50, in association with each other. In this case, the control unit 43 receives the registered equipment name from the in-vehicle device 50. Further, an equipment name may be used in addition to a MAC address.

The control unit 43 receives, from the in-vehicle device 50, information about whether the communication terminal 60 having the MAC address registered in the in-vehicle device 50 is connected to a Bluetooth communication unit 51 described later of the in-vehicle device 50. The control unit 43 controls, based on the received information, whether to cause the communication terminal 60 to communicate with the wireless LAN communication unit 41. When the control unit 43 causes the communication terminal 60 to communicate with the wireless LAN communication unit 41, and when communication between the communication terminal 60 and the wireless LAN communication unit 41 is cut off, the control unit 43 requests the wireless LAN communication unit 41 to establish communication with the communication terminal 60. When the control unit 43 does not cause the communication terminal 60 to communicate with the wireless LAN communication unit 41, and when communication between the communication terminal 60 and the wireless LAN communication unit 41 is established, the control unit 43 requests the wireless LAN communication unit 41 to cancel connection with the communication terminal 60.

Specifically, when the communication terminal 60 is connected to the Bluetooth communication unit 51 from the in-vehicle device 50, the control unit 43 causes the communication terminal 60 to communicate with the wireless LAN communication unit 41. On the other hand, when the communication terminal 60 is not connected to the Bluetooth communication unit 51 from the in-vehicle device 50, the control unit 43 does not cause the communication terminal 60 to communicate with the wireless LAN communication unit 41. In other words, when the communication terminal 60 is not connected to the Bluetooth communication unit 51, the control unit 43 cuts off communication of the communication terminal 60, and controls in such a way as to reject a connection request from the communication terminal 60.

The power supply circuit 44 is a circuit that performs appropriate voltage conversion and supplies power to each functional unit. The power supply circuit 44 supplies, to the wireless LAN communication unit 41, the WAN communication unit 42, and the control unit 43, power supplied from the in-vehicle device 50 via the USB connection port 45 described later.

The USB connection port 45 is a connection port which a USB cable is insertable into and removable from. The USB connection port 45 performs transmission and reception of data between the router 40 and the in-vehicle device 50 via the USB cable connected to the port, and supplies power to the router 40 from the in-vehicle device 50.

The memory 46 stores setting and the like necessary for the router 40 to operate.

Configuration Example of In-Vehicle Device

Figure 7:
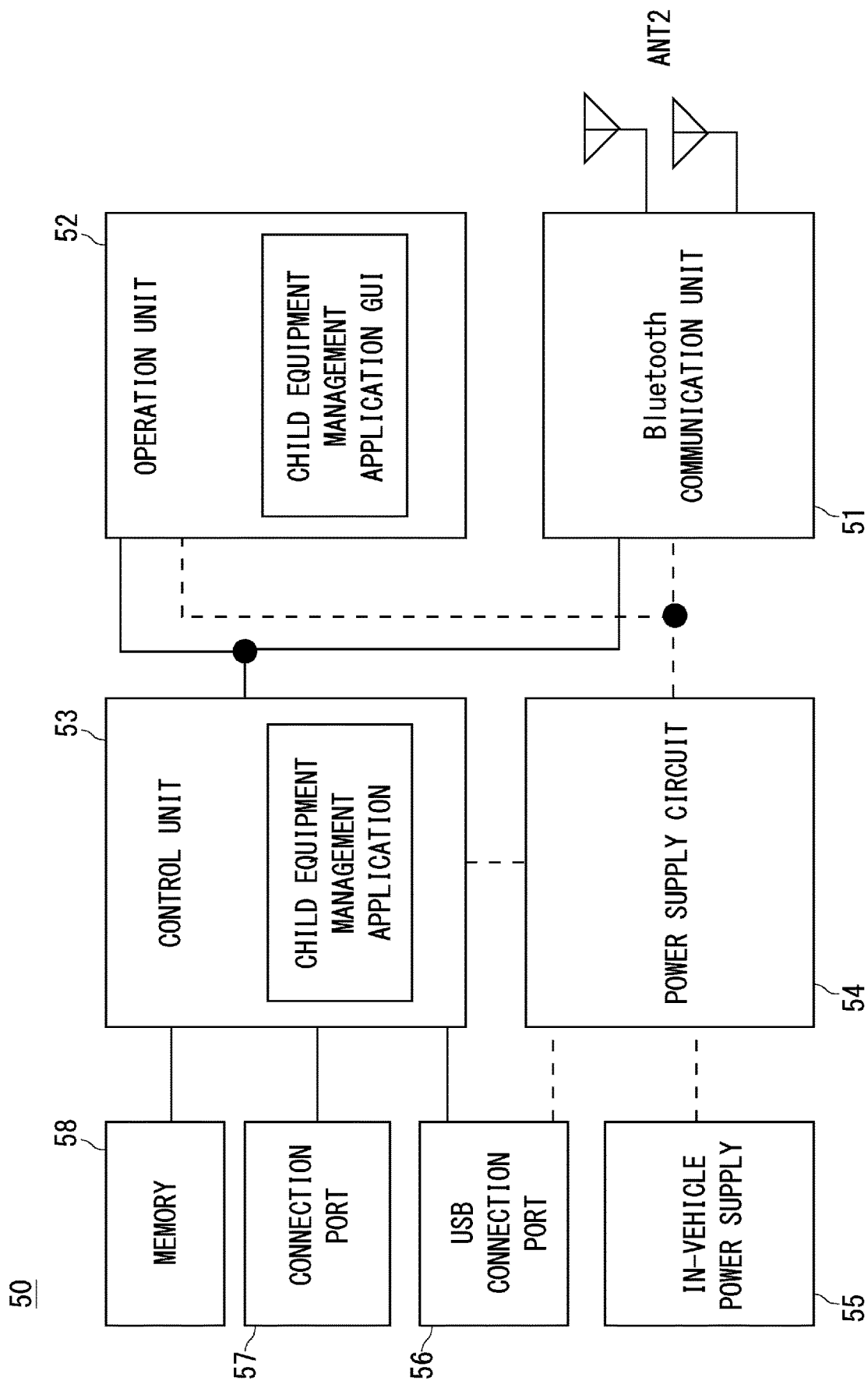
FIG. 7 is a diagram illustrating a configuration example of an in-vehicle device according to the third example embodiment.

Next, a configuration example of the in-vehicle device 50 is described by use of FIG. 7. FIG. 7 is a diagram illustrating a configuration example of an in-vehicle device according to the third example embodiment. The in-vehicle device 50 includes the Bluetooth communication unit 51, an operation unit 52, a control unit 53, a power supply circuit 54, an in-vehicle power supply 55, a USB connection port 56, a connection port 57, and a memory 58. In FIG. 7, a full line connecting functional units indicates a connection line between functional units performing transmission, reception, and the like of data and the like, and a dotted line connecting functional units indicates a connection line between functional units indicating supply of power.

The Bluetooth communication unit 51 corresponds to the second communication unit 21 according to the first example embodiment. The Bluetooth communication unit 51 forms a communication area indicated by the full line 202 in FIG. 3. The Bluetooth communication unit 51 performs BLE communication with the communication terminal 60 via the ANT 2. Note that, in the following description, BLE communication may be simply described as LE communication.

The Bluetooth communication unit 51 performs pairing with the communication terminal 60, and acquires a MAC address and an equipment name of a communication unit that performs Bluetooth communication of the communication terminal 60. In other words, the Bluetooth communication unit 51 acquires a MAC address and an equipment name of the communication terminal 60 for which connection is permitted. The Bluetooth communication unit 51 transmits the acquired MAC address and equipment name to the control unit 53 described later.

Further, the Bluetooth communication unit 51 transmits, to the control unit 53, information about whether the Bluetooth communication unit 51 performs LE communication with the communication terminal 60. In response to a request from the control unit 53, the Bluetooth communication unit 51 acquires information about whether the communication terminal 60 is connected, and transmits the information to the control unit 53.

Note that, the Bluetooth communication unit 51 may periodically perform LE communication with the communication terminal 60, acquire information about whether the communication terminal 60 is connected, and transmit the information to the control unit 53. Alternatively, when the communication terminal 60 performs LE communication and is connected, or when LE communication is cut off and connection is canceled, the Bluetooth communication unit 51 may transmit the connection or the cancellation of the connection to the control unit 53.

The operation unit 52 is a touch panel or the like that is operated on a display, transmits and receives information to and from the control unit 53 described later, displays, on the display, a guide user interface (GUI) for an operation of the in-vehicle device 50, and acquires information input by a user. Note that, the GUI may be referred to as a graphical user interface.

The operation unit 52 displays a GUI of a child equipment management application that the control unit 53 has, acquires the information input by a user, and transmits the information to the control unit 53. The child equipment management application is an application for registering any of MAC addresses acquired in the wireless LAN communication unit 41 of the router 40 and a MAC address acquired in the Bluetooth communication unit 51, in association with each other. A communication terminal (child equipment) that performs in-vehicle or out-of-vehicle determination using LE communication has to correspond to a communication terminal that is connected to or cut off from WAN side communication through wireless LAN communication. Thus, a MAC address of a communication terminal (child equipment) is linked by use of the child equipment management application.

The child equipment management application displays, by a GUI, the MAC address and the equipment name acquired in the Bluetooth communication unit 51 and the MAC address and the equipment name acquired in the wireless LAN communication unit 41 of the router 40. When a user selects any of MAC addresses acquired in the wireless LAN communication unit 41, the operation unit 52 transmits, to the control unit 53, the selected MAC address and the MAC address acquired in the Bluetooth communication unit 51, in association with each other.

Note that, a user may select any of equipment names acquired in the wireless LAN communication unit 41. In this case, the operation unit 52 transmits, to the control unit 53, the selected equipment name and the equipment name acquired in the Bluetooth communication unit 51, in association with each other.

Further, it is also conceived that, in the communication terminal 60, a MAC address of a communication unit that performs wireless LAN communication and a MAC address of a communication unit that performs Bluetooth communication are successive addresses. Specifically, for example, it is also conceived that addresses are successive in such a way that last one octet of a MAC address of a communication unit that performs wireless LAN communication is 10, and last one octet of a MAC address of a communication unit that performs Bluetooth communication is 11. Thus, when MAC addresses to be displayed are successive addresses, the operation unit 52 may display the MAC address acquired in the Bluetooth communication unit 51 and the MAC address acquired in the wireless LAN communication unit 41, in such a way as to previously associate with each other.

Further, it is also conceived that the equipment name acquired in the Bluetooth communication unit 51 and the equipment name acquired in the wireless LAN communication unit 41 are the same. Thus, when equipment names to be displayed are the same, the operation unit 52 may display the equipment name acquired in the Bluetooth communication unit 51 and the equipment name acquired in the wireless LAN communication unit 41, in such a way as to previously associate with each other.

The control unit 53 is a control unit that controls the in-vehicle device 50, and performs control and the like of communication with equipment connected to the in-vehicle device 50 and the memory 58, and the display that the operation unit 52 has. The child equipment management application is installed in the control unit 53. The control unit 53 receives, from the operation unit 52 by use of the child equipment management application, information in which a MAC address selected by a user is associated with the MAC address acquired in the Bluetooth communication unit 51. The control unit 53 registers, based on the received information, the MAC address selected by a user and the MAC address acquired in the Bluetooth communication unit 51, in association with each other.

The control unit 53 performs transmission and reception of information to and from the router 40 via the USB connection port 56 described later. The control unit 53 receives, from the control unit 43 of the router 40, the MAC address and the equipment name acquired by the wireless LAN communication unit 41. The control unit 53 transmits, to the control unit 43 of the router 40 via the USB connection port 56, the MAC address registered in association with the MAC address acquired in the Bluetooth communication unit 51.

Further, the control unit 53 transmits, to the control unit 43 of the router 40, information about whether the Bluetooth communication unit 51 performs LE communication with and is connected to the communication terminal 60. In response to a connection confirmation request from the control unit 43 of the router 40, the control unit 53 causes the Bluetooth communication unit 51 to perform LE communication with the communication terminal 60, acquires the information described above, and transmits the acquired information to the control unit 43 of the router 40.

Note that, when the communication terminal 60 performs LE communication with and is connected to the Bluetooth communication unit 51, or when LE communication is cut off and connection is canceled, the control unit 53 acquires, from the Bluetooth communication unit 51, the connection or the cancellation of the connection of the Bluetooth communication unit 51. The control unit 53 may transmit the acquired information to the control unit 43 of the router 40.

The power supply circuit 54 is a circuit that supplies power to each functional unit. The power supply circuit 54 is supplied with power from the in-vehicle power supply 55 described later, performs appropriate voltage conversion, and supplies power to the Bluetooth communication unit 51, the operation unit 52, and the control unit 53. Further, the power supply circuit 54 supplies power to the router 40 via a USB cable connected to the USB connection port 56 described later.

The in-vehicle power supply 55 is a power supply of an automobile. The in-vehicle power supply 55 supplies power to the power supply circuit 54.

The USB connection port 56 is a connection port which a USB cable is insertable into and removable from. The USB connection port 56 performs transmission and reception of data between the router 40 and the in-vehicle device 50 via the USB cable connected to the port, and supplies power to the router 40.

The connection port 57 is a port connected to equipment being in an automobile.

The memory 58 stores setting and the like necessary for the in-vehicle device 50 to operate. As described above, transmission output of the Bluetooth communication unit 51 of the in-vehicle device 50 needs to be suitably set according to a size of an automobile, and is adjusted in advance. The memory 58 stores the transmission output of the Bluetooth communication unit 51 adjusted in advance.

Operation Example of Communication System

Figure 8:
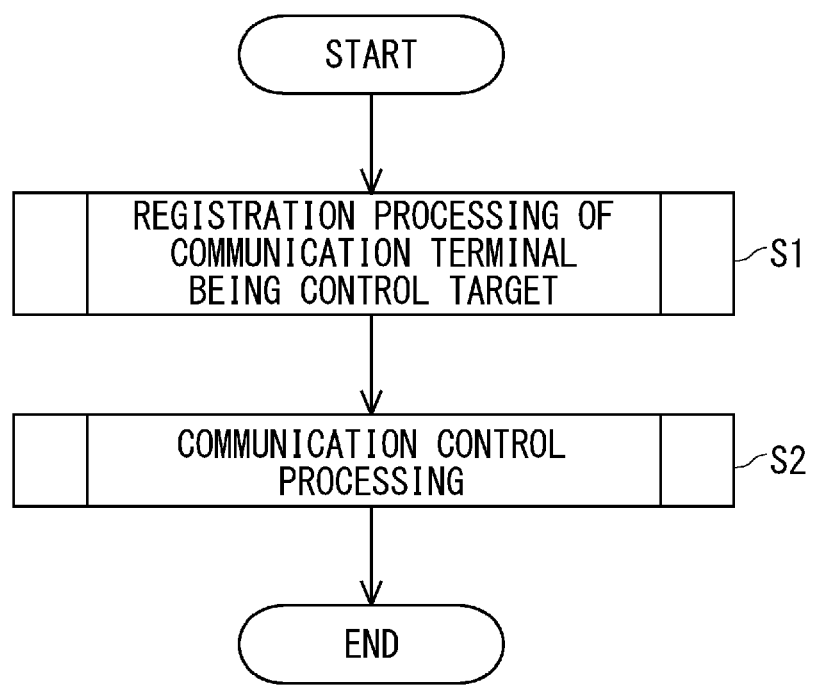
FIG. 8 is a diagram illustrating an operation example of the communication system according to the third example embodiment.
Figure 9:
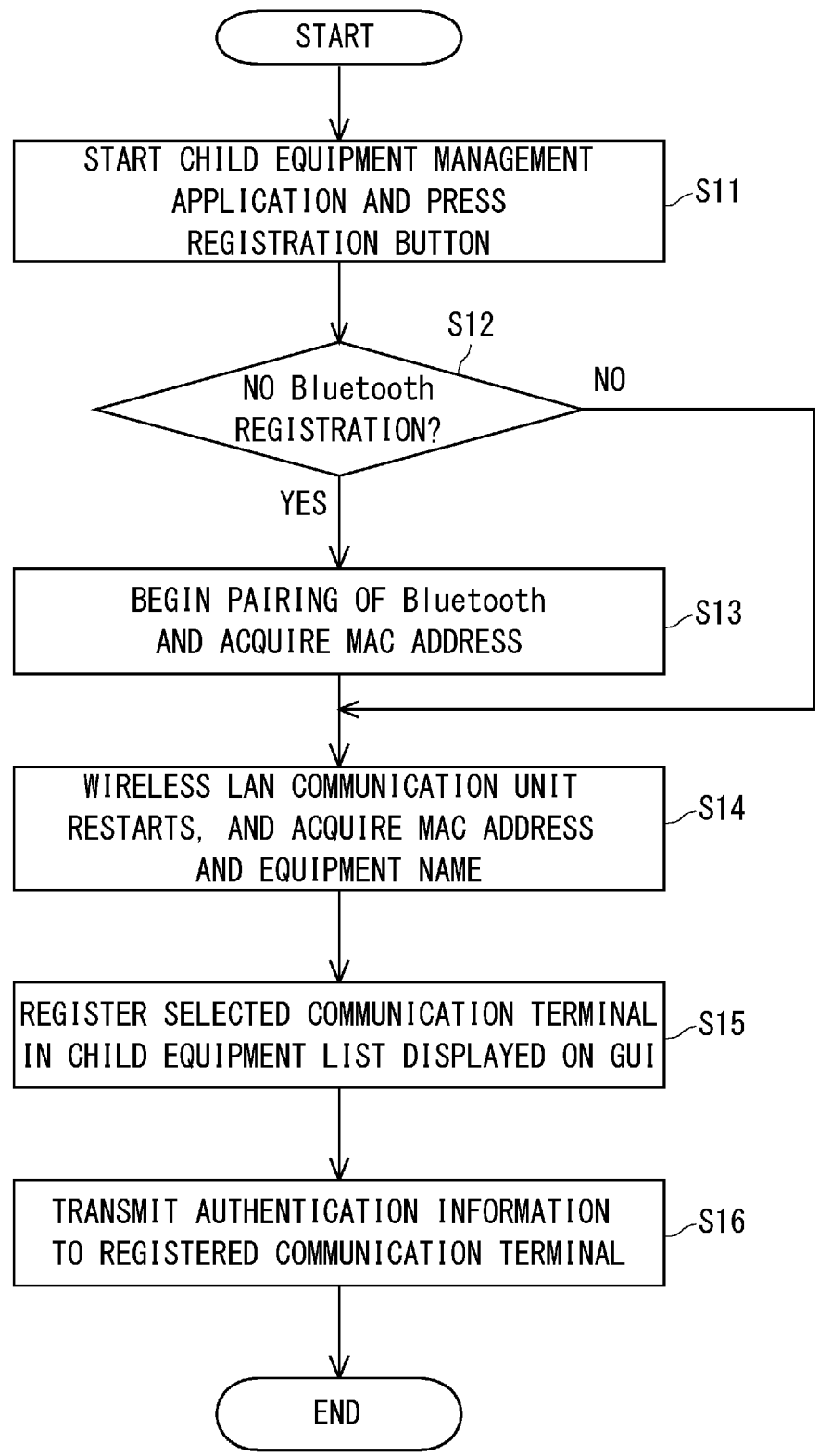
FIG. 9 is a diagram illustrating an operation example of the communication system according to the third example embodiment.
Figure 10:
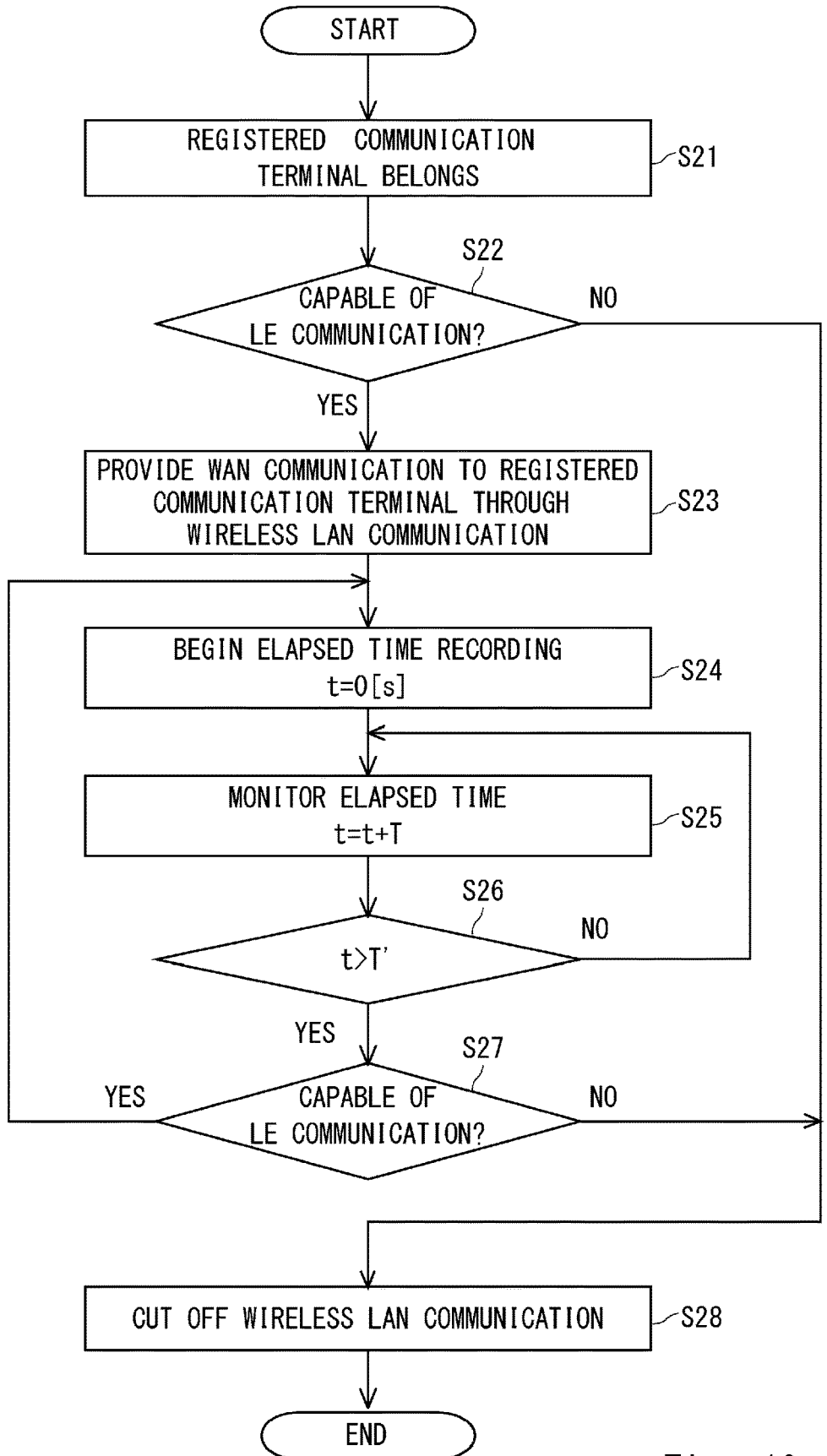
FIG. 10 is a diagram illustrating an operation example of the communication system according to the third example embodiment.

Next, an operation example of the communication system 100 according to the third example embodiment is described by use of FIGS. 8 to 10. FIGS. 8 to 10 are diagrams illustrating an operation example of a communication system according to the third example embodiment.

An overall operation of the communication system 100 is described by use of FIG. 8. As a premise, it is assumed that powers of the router 40 and the in-vehicle device 50 are turned on, and the communication terminal 60 being a communication terminal targeted for controlling communication is present inside an automobile. In this state, the communication system 100 executes registration processing (step S1) of the communication terminal being a control target and communication control processing (step S2).

Specifically, as the registration processing of the communication terminal being a control target, any of MAC addresses acquired in the router 40 and a MAC address acquired in the in-vehicle device 50 are registered in association with each other (step S1). Note that, although it is assumed that a MAC address is used as the registration processing of the communication terminal being a control target in the description of the operation example of the communication system 100, an equipment name may be used instead of a MAC address.

When two MAC addresses of the communication terminal 60 are registered, the router 40 controls, based on whether the communication terminal 60 is connected to the Bluetooth communication unit 51 of the in-vehicle device 50, whether to cause the communication terminal 60 to connect to the wireless LAN communication unit 41 (step S2). In other words, the control unit 43 controls, based on whether the communication terminal 60 having two MAC addresses registered in association with each other is connected to the Bluetooth communication unit 51, whether to cause the communication terminal 60 to connect to the wireless LAN communication unit 41.

Now, details of the registration processing of the communication terminal being a control target in step S1 of FIG. 8 are described by use of FIG. 9.

First, a user starts the child equipment management application from the GUI on the display in the operation unit 52 of the in-vehicle device 50, and presses a registration button of the child equipment (step S11).

Next, the child equipment management application determines whether no Bluetooth registration is made (step S12). Specifically, the child equipment management application determines whether a communication terminal already performing pairing with the Bluetooth communication unit 51 is present.

When a communication terminal already performing pairing with the Bluetooth communication unit 51 is not present (YES in step S12), an operation in step S13 is executed. In step S13, the Bluetooth communication unit 51 performs pairing with the communication terminal 60 being a communication terminal being a control target, and acquires a MAC address of a communication unit that performs Bluetooth communication of the communication terminal 60 (step S13).

On the other hand, when the Bluetooth communication unit 51 already performs pairing with the communication terminal 60 (NO in step S12), an operation in step S14 is performed.

Next, the wireless LAN communication unit 41 of the router 40 restarts, and a MAC address of a communication unit that performs wireless LAN communication of a connected communication terminal is acquired (step S14). Specifically, the control unit 53 of the in-vehicle device 50 instructs the control unit 43 of the router 40 to restart the wireless LAN communication unit 41 and acquire a MAC address of a communication terminal connected to the wireless LAN communication unit 41. When receiving the instruction described above, the control unit 43 performs restart of the wireless LAN communication unit 41.

The wireless LAN communication unit 41 starts in a free state where all communication terminals in a communication area are connectable, and acquires a MAC address and an equipment name of a communication unit that performs wireless LAN communication of a connected communication terminal. The wireless LAN communication unit 41 transmits the acquired MAC address and equipment name to the control unit 43, and the control unit 43 transmits the acquired MAC address and equipment name to the control unit 53 via a USB cable connected to the USB connection port 45. The control unit 53 displays the received MAC address and equipment name on a GUI of the child equipment management application.

Next, in a child equipment list (list of communication terminals) displayed on the GUI, a communication terminal selected by a user is registered as a communication terminal targeted for performing communication control (step S15). Specifically, when a MAC address of a wireless LAN/Bluetooth selected by a user is selected in the child equipment list displayed on the GUI, the operation unit 52 transmits the selected MAC address to the control unit 53 in an associated manner. The control unit 53 registers the selected MAC address in an associated manner. When a user selects a MAC address of the communication terminal 60, the control unit 53 registers a MAC address of a communication unit that performs wireless LAN communication of the communication terminal 60, and a MAC address of a communication unit that performs Bluetooth communication, in association with each other.

Next, the wireless LAN communication unit 41 of the router 40 transmits authentication information such as a password to the communication terminal 60 having the registered MAC address, cuts off connection of all communication terminals connected to the wireless LAN communication unit 41, and ends the free state (step S16).

Now, details of the communication control processing in step S2 of FIG. 8 are described by use of FIG. 10. Note that, the communication control processing in FIG. 10 is executed every time a communication terminal being a control target belongs (connects) to the wireless LAN communication unit 41 and the Bluetooth communication unit 51.

The communication terminal 60 being a control target in FIG. 9 is registered, and the communication terminal 60 belongs (connects) to the wireless LAN communication unit 41 of the router 40 and the Bluetooth communication unit 51 of the in-vehicle device 50 (step S21).

Next, whether the Bluetooth communication unit 51 is capable of LE communication with the communication terminal 60 is determined (step S22). When the communication terminal 60 is connected to the wireless LAN communication unit 41, the control unit 43 performs a confirmation request whether the Bluetooth communication unit 51 is capable of LE communication on the control unit 53 via the USB cable connected to the USB connection port 45.

When receiving the confirmation request, the control unit 53 confirms with the Bluetooth communication unit 51 whether the Bluetooth communication unit 51 is capable of LE communication with the communication terminal 60. The Bluetooth communication unit 51 transmits, to the control unit 53, information about whether the Bluetooth communication unit 51 is connected to the communication terminal 60 by LE communication. The control unit 53 transmits, to the control unit 43, information received from the Bluetooth communication unit 51 about whether the communication terminal 60 is connected to the Bluetooth communication unit 51. The control unit 43 determines, based on the information received from the control unit 53, whether the Bluetooth communication unit 51 is capable of LE communication.

When the Bluetooth communication unit 51 is capable of LE communication with the communication terminal 60 (YES in step S22), the control unit 43 provides WAN communication to the registered communication terminal 60 through wireless LAN communication (step S23).

On the other hand, when the Bluetooth communication unit 51 is not capable of LE communication with the communication terminal 60 (NO in step S22), the control unit 43 cuts off communication between the communication terminal 60 and the wireless LAN communication unit 41 (step S28), and ends processing. In other words, the control unit 43 controls in such a way as to keep the communication terminal 60 from communicating with the wireless LAN communication unit 41.

In step S24, the control unit 43 begins recording of an elapsed time t[s] in order to determine, again after elapse of a given time, whether to enable the communication terminal 60 to perform LE communication (step S24). In other words, the control unit 43 initializes the elapsed time t to 0 (zero).

The control unit 43 monitors the elapsed time (step S25), and determines whether the given time has elapsed (step S26). When the elapsed time t does not exceed the given time T' (NO in step S26), the control unit 43 returns to step S25, and continuously monitors the elapsed time.

When the elapsed time t exceeds the given time T' (YES in step S26), whether the Bluetooth communication unit 51 is capable of LE communication with the communication terminal 60 is determined (step S27). Note that, an operation executed in step S27 is similar to that in step S22, and, therefore, description thereof is omitted.

When the Bluetooth communication unit 51 is capable of LE communication with the communication terminal 60 in step S27 (YES in step S27), the processing returns to step S24, and the control unit 43 initializes the elapsed time t[s] and begins recording. In this case, the control unit 43 continuously provides WAN communication to the registered communication terminal 60 through wireless LAN communication.

On the other hand, when the Bluetooth communication unit 51 is not capable of LE communication with the communication terminal 60 in step S27 (NO in step S27), the control unit 43 cuts off communication between the communication terminal 60 and the wireless LAN communication unit 41 (step S28), and ends processing. In other words, the control unit 43 controls in such a way as to keep the communication terminal 60 from communicating with the wireless LAN communication unit 41.

As described above, the wireless LAN communication unit 41 of the router 40 starts in a state where all communication terminals in a communication area are connectable, and acquires a MAC address of a communication unit that performs wireless LAN communication of a connected communication terminal. In the in-vehicle device 50, the Bluetooth communication unit 51 acquires a MAC address of a communication unit that performs Bluetooth communication of a communication terminal for which connection is permitted. The operation unit 52 and the control unit 53 register two MAC addresses of a communication terminal being a control target in association with each other.

The router 40 controls, based on whether the communication terminal 60 having the MAC addresses registered in association with each other is connected to the Bluetooth communication unit 51, whether to cause the communication terminal 60 to communicate with the wireless LAN communication unit 41.

A communication area of the Bluetooth communication unit 51 is a communication area narrower than a communication area of the wireless LAN communication unit 41, and is adjusted to a region inside an automobile. When the communication terminal 60 is inside the communication area of the Bluetooth communication unit 51, the router 40 causes the communication terminal 60 to communicate with the wireless LAN communication unit 41. On the other hand, when the communication terminal 60 is outside the communication area of the Bluetooth communication unit 51, the router 40 controls in such a way as to keep the communication terminal 60 from communicating with the wireless LAN communication unit 41. In other words, the router 40 limits a communicable range of the wireless LAN communication unit 41 to the communication area of the Bluetooth communication unit 51. Since transmission output of the wireless LAN communication unit 41 is not limited, a communication speed of the communication terminal 60 does not deteriorate inside the communication area of the wireless LAN communication unit 41. Therefore, the router 40 according to the present example embodiment enables limiting a communicable range of the wireless LAN communication unit 41 without deteriorating a communication speed of the communication terminal 60.

Furthermore, the communication system 100 according to the present example embodiment enables regularly and automatically performing communication control of a communication terminal (child equipment) after performing initial registration of registering a MAC address of a communication terminal (child equipment) in an associated manner.

Modification Example

The child equipment management application is described as a configuration that the in-vehicle device 50 has in the third example embodiment described above, but may be a configuration that the router 40 has. In this case, the control unit 43 receives, from the in-vehicle device 50, a MAC address and an equipment name acquired in the in-vehicle device 50. Then, the control unit 43 is configured in such a way as to register, by use of the child equipment management application, any of MAC addresses acquired in the wireless LAN communication unit 41 and the MAC address received from the in-vehicle device 50, in association with each other. The control unit 43 may acquire the MAC address registered in association with the MAC address received from the in-vehicle device 50. Such a configuration also enables an advantageous effect similar to that according to the third example embodiment described above.

Fourth Example Embodiment

Now, a fourth example embodiment is described. The fourth example embodiment is an example embodiment in which the second example embodiment is described in detail. Further, the fourth example embodiment includes a configuration in which the router 40 and the in-vehicle device 50 according to the third example embodiment are replaced by a router 70. Thus, in the present example embodiment, shared description according to the third example embodiment is given by use of the drawings used in the third example embodiment.

Configuration Example of Router

Figure 11:
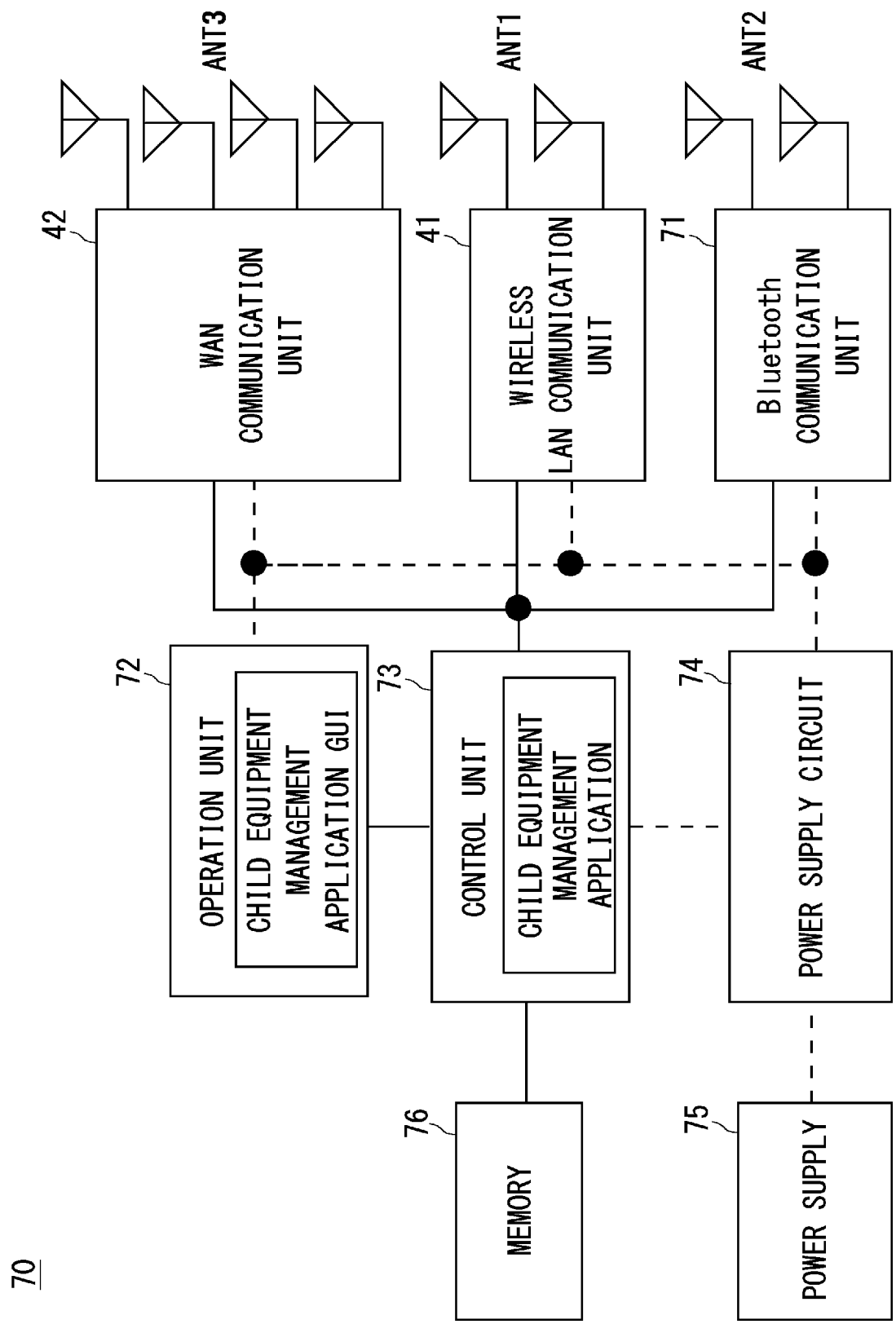
FIG. 11 is a diagram illustrating a configuration example of a router according to a fourth example embodiment.

Next, the router 70 according to the fourth example embodiment is described by use of FIG. 11. FIG. 11 is a diagram illustrating a configuration example of a router according to the fourth example embodiment.

The router 70 is a communication device arranged inside the full line 200 in FIG. 3. In other words, the router 70 is a communication device arranged inside an automobile. Note that, a predetermined region is described as a region inside an automobile in the present example embodiment as well, but is not restricted to this, and the router 70 may be arranged in a previously determined region inside a building or inside a moving body.

The router 70 according to the fourth example embodiment has a configuration basically similar to that of the router 40 according to the third example embodiment. Thus, in the present example embodiment, the same reference sign is assigned to a component similar to that of the router 40 according to the third example embodiment, and description thereof is omitted accordingly.

The router 70 includes a wireless LAN communication unit 41, a WAN communication unit 42, a Bluetooth communication unit 71, an operation unit 72, a control unit 73, a power supply circuit 74, a power supply 75, and a memory 76.

Since the wireless LAN communication unit 41 and the WAN communication unit 42 are similar to those according to the third example embodiment, description thereof is omitted.

The Bluetooth communication unit 71 corresponds to the Bluetooth communication unit 51 according to the third example embodiment. Since the Bluetooth communication unit 71 has a configuration similar to that of the Bluetooth communication unit 51 according to the third example embodiment, description thereof is omitted accordingly.

The Bluetooth communication unit 71 acquires a MAC address and an equipment name of a communication unit that performs Bluetooth communication of a communication terminal 60, and transmits the MAC address and the equipment name to the control unit 73. The Bluetooth communication unit 71 also transmits, to the control unit 73, information about whether the Bluetooth communication unit 51 performs LE communication with the communication terminal 60.

The operation unit 72 corresponds to the operation unit 52 according to the third example embodiment. Since the operation unit 72 has a configuration similar to that of the operation unit 52 according to the third example embodiment, description thereof is omitted accordingly.

The operation unit 72 displays, on a GUI of a child equipment management application, a MAC address of a communication terminal acquired in the wireless LAN communication unit 41, and the MAC address acquired in the Bluetooth communication unit 71. When a user selects any of MAC addresses acquired in the wireless LAN communication unit 41, the operation unit 72 transmits, to the control unit 73, the selected MAC address and the MAC address acquired in the Bluetooth communication unit 71, in association with each other.

The control unit 73 is a control unit having the configuration of each of the control units 43 and 53 according to the third example embodiment. The control unit 73 registers, based on the information received from the operation unit 72, the selected MAC address and the MAC address acquired in the Bluetooth communication unit 71, in association with each other. The control unit 73 acquires a MAC address registered in association with a MAC address of a communication unit that performs Bluetooth communication of a communication terminal as a MAC address of a communication unit that performs wireless LAN communication of the communication terminal.

When two MAC addresses of the communication terminal 60 are registered in association with each other, the control unit 73 controls, based on whether the communication terminal 60 is connected to the Bluetooth communication unit 71, whether to cause the communication terminal 60 to communicate with the wireless LAN communication unit 41.

Specifically, when the communication terminal 60 is connected to the Bluetooth communication unit 71, the control unit 73 causes the communication terminal 60 to communicate with the wireless LAN communication unit 41. On the other hand, when the communication terminal 60 is not connected to the Bluetooth communication unit 71, the control unit 73 does not cause the communication terminal 60 to communicate with the wireless LAN communication unit 41.

The power supply circuit 74 is a circuit that supplies power to each functional unit. The power supply circuit 74 is supplied with power from the power supply 75 described later, performs appropriate voltage conversion, and supplies power to the wireless LAN communication unit 41, the WAN communication unit 42, the Bluetooth communication unit 71, the operation unit 72, and the control unit 73. Note that, the router 70 may not have the power supply 75, and may be configured to be supplied with power from an in-vehicle device as in the third example embodiment.

The power supply 75 is, for example, a battery, and supplies power to the power supply circuit 74.

The memory 76 stores setting and the like necessary for the router 70 to operate. The memory 76 stores transmission output of the Bluetooth communication unit 71 adjusted in advance.

Operation Example of Router

Next, an operation example of the router 70 is described. The router 70 according to the present example embodiment executes an operation described by use of FIGS. 8 to 10. Thus, the operation example of the router 70 is described by use of FIGS. 8 to 10 while omitting description thereof accordingly.

First, an overall operation of the router 70 is described by use of FIG. 8. The router 70 registers any of MAC addresses acquired in the wireless LAN communication unit 41 and a MAC address acquired in the Bluetooth communication unit 71, in association with each other (step S1).

Next, when two MAC addresses of the communication terminal 60 are registered, the control unit 73 controls, based on whether the communication terminal 60 is connected to the Bluetooth communication unit 71, whether to cause the communication terminal 60 to connect the wireless LAN communication unit 41 (step S2).

Now, details of registration processing of the communication terminal being a control target in step S1 of FIG. 8 are described by use of FIG. 9.

First, a user starts the child equipment management application from the GUI on a display in the operation unit 72, and presses a registration button of a child equipment (step S11).

Next, the child equipment management application determines whether no Bluetooth registration is made (step S12).

When a communication terminal already performing pairing with the Bluetooth communication unit 71 is not present (YES in step S12), the Bluetooth communication unit 71 performs pairing with the communication terminal 60 being a communication terminal being a control target. The Bluetooth communication unit 71 acquires a MAC address of a communication unit that performs Bluetooth communication of the communication terminal 60 (step S13). On the other hand, when the Bluetooth communication unit 71 already performs pairing with the communication terminal 60 (NO in step S12), an operation in step S14 is performed.

Next, in response to a request from the control unit 73, the wireless LAN communication unit 41 restarts, and a MAC address of a communication unit that performs wireless LAN communication of a connected communication terminal is acquired (step S14).

Next, in a child equipment list (list of communication terminals) displayed on the GUI, a communication terminal selected by a user is registered as a communication terminal targeted for performing communication control (step S15). When a user selects a MAC address of the communication terminal 60, the control unit 73 registers a MAC address of a communication unit that performs wireless LAN communication of the communication terminal 60, and a MAC address of a communication unit that performs Bluetooth communication, in association with each other.

Next, the wireless LAN communication unit 41 transmits authentication information such as a password to the communication terminal 60 having the registered MAC address, cuts off connection of all communication terminals connected to the wireless LAN communication unit 41, and ends a free state (step S16).

Now, details of communication control processing in step S2 of FIG. 8 are described by use of FIG. 10.

The communication terminal 60 being a control target is registered, and the communication terminal 60 belongs (connects) to the wireless LAN communication unit 41 and the Bluetooth communication unit 71 (step S21).

Next, the control unit 73 determines whether the Bluetooth communication unit 71 is capable of LE communication with the communication terminal 60 (step S22).

When the Bluetooth communication unit 71 is capable of LE communication with the communication terminal 60 (YES in step S22), the control unit 73 provides WAN communication to the registered communication terminal 60 through wireless LAN communication (step S23).

On the other hand, when the Bluetooth communication unit 71 is not capable of LE communication with the communication terminal 60 (NO in step S22), the control unit 73 cuts off communication between the communication terminal 60 and the wireless LAN communication unit 41 (step S28), and ends processing.

In step S24, the control unit 73 begins recording of an elapsed time t[s] in order to determine, again after elapse of a given time, whether to enable the communication terminal 60 to perform LE communication (step S24).

The control unit 73 monitors the elapsed time (step S25), and, when the elapsed time t does not exceed the given time T' (NO in step S26), the control unit 73 returns to step S25, and continuously monitors the elapsed time. When the elapsed time t exceeds the given time T' (YES in step S26), the control unit 73 determines whether the Bluetooth communication unit 71 is capable of LE communication with the communication terminal 60 (step S27).

When the Bluetooth communication unit 71 is capable of LE communication with the communication terminal 60 in step S27 (YES in step S27), the processing returns to step S24, and the control unit 73 initializes the elapsed time t[s] and begins recording. In this case, the control unit 73 continuously provides WAN communication to the registered communication terminal 60 through wireless LAN communication.

On the other hand, when the Bluetooth communication unit 71 is not capable of LE communication with the communication terminal 60 in step S27 (NO in step S27), the control unit 73 cuts off communication between the communication terminal 60 and the wireless LAN communication unit 41 (step S28), and ends processing.

As described above, a communication area of the Bluetooth communication unit 71 is a communication area narrower than a communication area of the wireless LAN communication unit 41, and the communication area is adjusted to a region inside an automobile. When the communication terminal 60 is inside the communication area of the Bluetooth communication unit 71, the router 70 causes the communication terminal 60 to communicate with the wireless LAN communication unit 41. In other words, as in the third example embodiment, the router 70 also limits a communicable range of the wireless LAN communication unit 41 to the communication area of the Bluetooth communication unit 71. Since transmission output of the wireless LAN communication unit 41 is not limited, a communication speed of the communication terminal 60 does not deteriorate inside the communication area of the wireless LAN communication unit 41. Therefore, the router 70 according to the present example embodiment enables limiting a communicable range of the wireless LAN communication unit 41 without deteriorating a communication speed of the communication terminal 60.

Further, as in the third example embodiment, using the router 70 according to the present example embodiment enables regularly and automatically performing communication control of a communication terminal (child equipment) after performing initial registration of registering a MAC address of a communication terminal (child equipment) in an associated manner.

Other Example Embodiments

<1> In the example embodiments described above, MAC addresses of a communication unit that performs wireless LAN communication of the communication terminal being a communication control target and a communication unit that performs Bluetooth communication are acquired in a wireless LAN communication unit and a Bluetooth communication unit, respectively. The example embodiments described above may be modified in such a way that a communication terminal transmits the two MAC addresses at a time. This enables the wireless LAN communication unit or the Bluetooth communication unit to acquire the two MAC addresses. This enables a control unit (child equipment management application) to automatically execute registration processing of a MAC address of the communication terminal being a communication control target.

<2> In the example embodiments described above, in association with a communication terminal being a communication control target, another communication terminal may be registered. In this case, a router determines whether the communication terminal being a communication control target is present in a predetermined region, and controls whether to cause the communication terminal to perform wireless LAN communication. When the communication terminal being a communication control target is connected to a Bluetooth communication unit, the router estimates that the another communication terminal is also connectable to the Bluetooth communication unit, and becomes capable of controlling in such a way as to cause the another communication terminal to perform wireless LAN communication. This enables the router to reduce the number of communication terminals being communication control targets, and improve processing capability.

Figure 12:
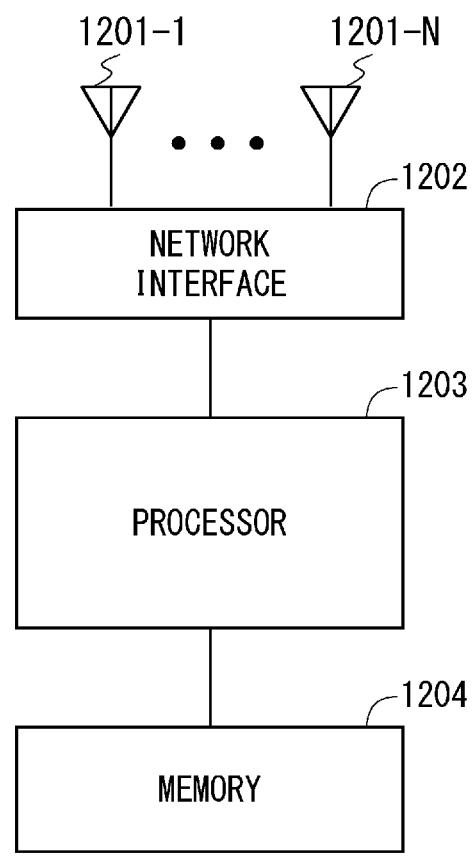
FIG. 12 is a block diagram exemplifying a hardware configuration of a communication device and the like according to each example embodiment of the present disclosure.

<3> The communication devices 10, 20, and 30, the routers 40 and 70, and the in-vehicle device 50 (hereinafter, referred to as the communication device 10 and the like) described in the example embodiments described above may each have the following hardware configuration. FIG. 12 is a block diagram exemplifying a hardware configuration of a computer (information processing device) being capable of achieving a communication device and the like according to each example embodiment of the present disclosure.

Referring to FIG. 12, the communication device 10 and the like each includes a plurality of antennas 1201-1 to 1201-N, a network interface 1202, a processor 1203, and a memory 1204. The plurality of antennas 1201-1 to 1201-N and the network interface 1202 are used in order to communicate with another wireless communication device including a communication terminal 60. The network interface 1202 may include a network interface card (NIC) being compliant with, for example, Institute of Electrical and Electronics Engineers (IEEE) 802.11 series, IEEE 802.3 series, and the like.

The processor 1203 performs processing of the communication device 10 and the like described by use of a flowchart in the example embodiments described above, by reading and executing software (a computer program) from the memory 1204. The processor 1203 may be, for example, a microprocessor, a micro processing unit (MPU), or a central processing unit (CPU). The processor 1203 may include a plurality of processors.

The memory 1204 is configured by a combination of a volatile memory and a non-volatile memory. The memory 1204 may include a storage arranged apart from the processor 1203. In this case, the processor 1203 may access the memory 1204 via a non-illustrated I/O interface.

In the example of FIG. 12, the memory 1204 is used in order to store a software module group. The processor 1203 can perform the processing of the communication device 10 and the like described in the example embodiments described above, by reading and executing the software module group from the memory 1204.

As described by use of FIG. 12, each of the processors that the communication device 10 and the like have executes one or a plurality of programs including an instruction group for causing the computer to perform an algorithm described by use of the drawings.

In the example described above, a program is stored by use of various types of non-transitory computer readable media, and can be supplied to the computer. The non-transitory computer-readable media include various types of tangible storage media. Examples of non-transitory computer readable media include a magnetic recording medium (e.g., a flexible disk, a magnetic tape, and a hard disk drive), and a magneto-optical recording medium (e.g., a magneto-optical disk). Further, examples of non-transitory computer readable media include a CD-read only memory (CD-ROM), a CD-R, and a CD-R/W. Further, an example of non-transitory computer readable medium includes a semiconductor memory. The semiconductor memory includes, for example, a mask ROM, a programmable ROM (PROM), an erasable PROM (EPROM), a flash ROM, and a random access memory (RAM). Further, the program may be supplied to the computer by various types of transitory computer readable media. Examples of transitory computer readable media include an electric signal, an optical signal, and an electromagnetic wave. The transitory computer readable medium can supply the program to the computer via a wired communication path such as an electric wire and an optical fiber, or a wireless communication path.

Note that, the present disclosure is not limited to the example embodiments described above, and modifications can be suitably made without departing from the spirit thereof. Further, the present disclosure may be implemented by suitably combining the example embodiments.

Some or all of the example embodiments described above can also be described as, but are not limited to, the following supplementary notes.

(Supplementary Note 1)

A communication device including:

a first communication unit configured to form a first communication area, and acquire first identification information of a communication terminal connected in a state where all communication terminals in the first communication area are connectable; and a control unit configured to acquire, from among pieces of the acquired first identification information, third identification information that another communication device has and that is associated with second identification information of a communication terminal permitted to connect to a second communication unit forming a second communication area included in the first communication area, wherein when the third identification information is acquired, the first communication unit shifts into a state where only a communication terminal having the third identification information is connectable, and the control unit receives, from the another communication device, information about whether a communication terminal having the second identification information is connected to the second communication unit, and controls, based on the received information, whether to cause a communication terminal having the third identification information to communicate with the first communication unit.

(Supplementary Note 2)

The communication device according to Supplementary note 1, wherein
the control unit transmits the acquired first identification information to the another communication device, receives, from the another communication device, identification information registered in association with the second identification information, and acquires the received identification information as the third identification information.

(Supplementary Note 3)

The communication device according to Supplementary note 1, wherein
the control unit is configured to receive the second identification information from the another communication device, register any of pieces of the acquired first identification information and the second identification information in association with each other, and acquire identification information registered in association with the second identification information as the third identification information.

(Supplementary Note 4)

A communication device including:
a first communication unit configured to form a first communication area, and acquire first identification information of a communication terminal connected in a state where all communication terminals in the first communication area are connectable;
a second communication unit configured to form a second communication area included in the first communication area, and acquire second identification information of a communication terminal for permitted to connect; and
a control unit configured to register any of pieces of the acquired first identification information and the second identification information in association with each other, wherein
the first communication unit shifts into a state where only a communication terminal having third identification information indicating identification information registered in association with the second identification information is connectable, and
the control unit controls, based on whether a communication terminal having the second identification information is connected to the second communication unit, whether to cause a communication terminal having the third identification information to communicate with the first communication unit.

(Supplementary Note 5)

The communication device according to any one of Supplementary notes 1 to 4, wherein
when a communication terminal having the second identification information is connected to the second communication unit, the control unit causes a communication terminal having the third identification information to communicate with the first communication unit.

(Supplementary Note 6)

The communication device according to Supplementary note 5, wherein
the first communication unit transmits authentication information to a communication terminal having the third identification information, and connects to a communication terminal having the third identification information by use of the authentication information when a communication terminal having the second identification information is connected to the second communication unit.

(Supplementary Note 7)

The communication device according to any one of Supplementary notes 1 to 6, wherein
the second communication area is a communication area formed in a predetermined region.

(Supplementary Note 8)

The communication device according to Supplementary note 7, wherein
the predetermined region is a previously determined region inside a building or inside a moving body.

(Supplementary Note 9)

The communication device according to Supplementary note 8, wherein
the moving body is a vehicle including one of an automobile and a train.

(Supplementary Note 10)

The communication device according to any one of Supplementary notes 1 to 9, wherein
the first communication unit is a communication unit configured to perform wireless LAN communication, and the first identification information is identification information set for a communication unit configured to perform wireless LAN communication of a communication terminal, and
the second communication unit is a communication unit configured to perform Bluetooth low energy (BLE) communication, and the second identification information is identification information set for a communication unit configured to perform Bluetooth communication of a communication terminal.

(Supplementary Note 11)

The communication device according to any one of Supplementary notes 1 to 10, wherein
the first identification information and the second identification information include at least one of a media access control (MAC) address and an equipment name.

(Supplementary Note 12)

A communication control method including:
acquiring first identification information of a communication terminal connected to a first communication unit configured to form a first communication area and operate in a state where all communication terminals in the first communication area are connectable;
acquiring, from among pieces of the acquired first identification information, third identification information that another communication device has and that is associated with second identification information of a communication terminal permitted to connect to a second communication unit forming a second communication area included in the first communication area;
shifting the first communication unit into a state where only a communication terminal having the third identification information is connectable, when the third identification information is acquired; and
receiving, from the another communication device, information about whether a communication terminal having the second identification information is connected to the second communication unit, and controlling, based on the received information, whether to cause a communication terminal having the third identification information to communicate with the first communication unit.

(Supplementary Note 13)

A communication control method including:
acquiring first identification information of a communication terminal connected to a first communication unit configured to form a first communication area and operate in a state where all communication terminals in the first communication area are connectable;

acquiring second identification information of a communication terminal permitted to connect to a second communication unit forming a second communication area included in the first communication area;

registering any of pieces of the acquired first identification information and the second identification information in association with each other;

shifting the first communication unit into a state where only a communication terminal having third identification information indicating identification information registered in association with the second identification information is connectable; and controlling, based on whether a communication terminal having the second identification information is connected to the second communication unit, whether to cause a communication terminal having the third identification information to communicate with the first communication unit.

(Supplementary Note 14)

A communication control program causing a computer to execute:

acquiring first identification information of a communication terminal connected to a first communication unit configured to form a first communication area and operate in a state where all communication terminals in the first communication area are connectable;

acquiring, from among pieces of the acquired first identification information, third identification information that another communication device has and that is associated with second identification information of a communication terminal permitted to connect to a second communication unit forming a second communication area included in the first communication area;

shifting the first communication unit into a state where only a communication terminal having the third identification information is connectable, when the third identification information is acquired; and receiving, from the another communication device, information about whether a communication terminal having the second identification information is connected to the second communication unit, and controlling, based on the received information, whether to cause a communication terminal having the third identification information to communicate with the first communication unit.

(Supplementary Note 15)

A communication control program causing a computer to execute:

acquiring first identification information of a communication terminal connected to a first communication unit configured to form a first communication area and operate in a state where all communication terminals in the first communication area are connectable;

acquiring second identification information of a communication terminal permitted to connect to a second communication unit forming a second communication area included in the first communication area;

registering any of pieces of the acquired first identification information and the second identification information in association with each other;

shifting the first communication unit into a state where only a communication terminal having third identification information indicating identification information registered in association with the second identification information is connectable; and controlling, based on whether a communication terminal having the second identification information is connected to the second communication unit, whether to cause a communication terminal having the third identification information to communicate with the first communication unit.

(Supplementary Note 16)

A communication system including:

a first communication device; and a second communication device connected to the first communication device, wherein the first communication device including a first communication unit configured to form a first communication area, and acquire first identification information of a communication terminal connected in a state where all communication terminals in the first communication area are connectable, and a control unit configured to acquire, from among pieces of the acquired first identification information, third identification information that the second communication device has and that is associated with second identification information of a communication terminal permitted to connect to a second communication unit forming a second communication area included in the first communication area, when the third identification information is acquired, the first communication unit shifts into a state where only a communication terminal having the third identification information is connectable, and the control unit receives, from the second communication device, information about whether a communication terminal having the second identification information is connected to the second communication unit, and controls, based on the received information, whether to cause a communication terminal having the third identification information to communicate with the first communication unit.

(Supplementary Note 17)

The communication system according to Supplementary note 16, wherein the control unit transmits the acquired first identification information to the second communication device, receives, from among pieces of the acquired first identification information in the second communication device, identification information registered in association with the second identification information, and acquires the received identification information as the third identification information.

(Supplementary Note 18)

The communication system according to Supplementary note 17, wherein when a communication terminal having the second identification information is connected to the second communication unit, the control unit causes a communication terminal having the third identification information to communicate with the first communication unit.

This application is based upon and claims the benefit of priority from Japanese Patent Application No. 2018-223367, filed on Nov. 29, 2018, the disclosure of which is incorporated herein in its entirety by reference.

REFERENCE SIGNS LIST

1 Communication System
10, 20, 30 Communication Device
11, 31 First Communication Unit 12, 33 Control Unit
21, 32 Second Communication Unit
40, 70 Router
41 Wireless LAN Communication Unit
42 WAN Communication Unit
43, 53, 73 Control Unit
44, 54, 74 Power Supply Circuit
45, 56 USB Connection Port
46, 76 Memory
50 In-Vehicle Device
51, 71 Bluetooth Communication Unit
52, 72 Operation Unit
55 In-Vehicle Power Supply
57 Connection Port
58 Memory
75 Power Supply

What is claimed is:

1. A communication device comprising:
hardware, including a processor and a memory; and
a first communication unit that is implemented at least by the hardware and forms a first communication area, and acquires first identification information of a communication terminal connected in a state where all communication terminals in the first communication area are connectable; and
a control unit that is implemented at least by the hardware and acquires from among pieces of the acquired first identification information, third identification information that another communication device has and that is associated with second identification information of a communication terminal permitted to connect to a second communication unit configured to form a second communication area included in the first communication area, wherein
when the third identification information is acquired, the first communication unit shifts into a state where only a communication terminal having the third identification information is connectable, and
the control unit receives, from the another communication device, information about whether a communication terminal having the second identification information is connected to the second communication unit, and controls, based on the received information, whether to cause a communication terminal having the third identification information to communicate with the first communication unit.

2. The communication device according to claim 1, wherein
the control unit transmits the acquired first identification information to the another communication device, receives, from the another communication device, identification information registered in association with the second identification information, and acquires the received identification information as the third identification information.

3. The communication device according to claim 1, wherein
the control unit is configured to receive the second identification information from the another communication device, register any of pieces of the acquired first identification information and the second identification information in association with each other, and acquire identification information registered in association with the second identification information as the third identification information.

4. The communication device according to claim 1, wherein
when a communication terminal having the second identification information is connected to the second communication unit, the control unit causes a communication terminal having the third identification information to communicate with the first communication unit.

5. The communication device according to claim 4, wherein
the first communication unit transmits authentication information to a communication terminal having the third identification information, and connects to a communication terminal having the third identification information by use of the authentication information when a communication terminal having the second identification information is connected to the second communication unit.

6. The communication device according to claim 4, wherein
the first communication unit transmits authentication information to a communication terminal having the third identification information, and connects to a communication terminal having the third identification information by use of the authentication information when a communication terminal having the second identification information is connected to the second communication unit.

7. The communication device according to claim 1, wherein
the second communication area is a communication area formed in a predetermined region.

8. The communication device according to claim 7, wherein
the predetermined region is a previously determined region inside a building or inside a moving body.

9. The communication device according to claim 8, wherein
the moving body is a vehicle including one of an automobile and a train.

10. The communication device according to claim 1, wherein
the first communication unit is configured to perform wireless LAN communication, and the first identification information is identification information set for communication unit is configured to perform wireless LAN communication of a communication terminal, and
the second communication unit is configured to perform Bluetooth low energy (BLE) communication, and the second identification information is identification information set for communication unit is configured to perform Bluetooth communication of a communication terminal.

11. The communication device according to claim 1, wherein
the first identification information and the second identification information include at least one of a media access control (MAC) address and an equipment name.

12. A communication device comprising:
hardware, including a processor and a memory; and
a first communication unit that is implemented at least by the hardware and forms a first communication area, and acquires first identification information of a communication terminal connected in a state where all communication terminals in the first communication area are connectable;
a second communication unit that is implemented at least by the hardware and forms a second communication area included in the first communication area, and acquires second identification information of a communication terminal permitted to connect; and a control unit that is implemented at least by the hardware and registers any of pieces of the acquired first identification information and the second identification information in association with each other, wherein the first communication unit shifts into a state where only a communication terminal having third identification information indicating identification information registered in association with the second identification information is connectable, and the control unit controls, based on whether a communication terminal having the second identification information is connected to the second communication unit, whether to cause a communication terminal having the third identification information to communicate with the first communication unit.

13. The communication device according to claim 12, wherein when a communication terminal having the second identification information is connected to the second communication unit, the control unit causes a communication terminal having the third identification information to communicate with the first communication unit.

14. The communication device according to claim 12, wherein the second communication area is a communication area formed in a predetermined region.

15. The communication device according to claim 14, wherein the predetermined region is a previously determined region inside a building or inside a moving body.

16. The communication device according to claim 15, wherein the moving body is a vehicle including one of an automobile and a train.

17. The communication device according to claim 12, wherein the first communication unit is configured to perform wireless LAN communication, and the first identification information is identification information set for communication unit is configured to perform wireless LAN communication of a communication terminal, and the second communication unit is configured to perform Bluetooth low energy (BLE) communication, and the second identification information is identification information set for communication unit is configured to perform Bluetooth communication of a communication terminal.

18. The communication device according to claim 12, wherein the first identification information and the second identification information include at least one of a media access control (MAC) address and an equipment name.

19. A communication control method comprising:

acquiring first identification information of a communication terminal connected to a first communication unit configured to form a first communication area and operate in a state where all communication terminals in the first communication area are connectable;

acquiring, from among pieces of the acquired first identification information, third identification information that another communication device has and that is associated with second identification information of a communication terminal permitted to connect to a second communication unit configured to form a second communication area included in the first communication area;

shifting the first communication unit into a state where only a communication terminal having the third identification information is connectable, when the third identification information is acquired; and receiving, from the another communication device, information about whether a communication terminal having the second identification information is connected to the second communication unit, and controlling, based on the received information, whether to cause a communication terminal having the third identification information to communicate with the first communication unit.

* * * * *